(12) United States Patent
Butler et al.

(10) Patent No.: US 10,654,529 B2
(45) Date of Patent: May 19, 2020

(54) AERODYNAMIC SYSTEMS AND FAIRINGS WITH FAIRING CAPS

(71) Applicant: FlowBelow Aero, Inc., Austin, TX (US)

(72) Inventors: Joshua Butler, Austin, TX (US); Kyle Walker, Austin, TX (US)

(73) Assignee: FLOWBELOW AERO, INC., Austin, TX (US)

( * ) Notice: Subject to any disclaimer, the term of this patent is extended or adjusted under 35 U.S.C. 154(b) by 0 days.

(21) Appl. No.: 16/017,591

(22) Filed: Jun. 25, 2018

(65) Prior Publication Data

US 2018/0370580 A1 Dec. 27, 2018

Related U.S. Application Data

(60) Provisional application No. 62/524,528, filed on Jun. 24, 2017, provisional application No. 62/538,791, filed on Jul. 30, 2017.

(51) Int. Cl.
*B62D 35/00* (2006.01)
*B62D 37/02* (2006.01)

(52) U.S. Cl.
CPC ......... *B62D 35/001* (2013.01); *B62D 35/008* (2013.01); *B62D 37/02* (2013.01)

(58) Field of Classification Search
CPC ............................ B62D 35/001; B62D 35/008
USPC ...................................................... 296/180.4
See application file for complete search history.

(56) References Cited

U.S. PATENT DOCUMENTS

| | | |
|---|---|---|
| 1,072,907 A | 9/1913 | Brooks |
| 1,827,662 A | 10/1931 | Maas |
| 2,059,045 A | 10/1936 | Seymour |
| 2,190,117 A | 3/1939 | Griffith |
| 2,538,839 A | 1/1951 | Limberg |
| 2,605,119 A | 7/1952 | Earnest |
| 2,715,430 A | 8/1952 | Lindeman |
| 2,685,906 A | 8/1954 | Williams |
| 2,931,414 A | 4/1956 | Jankowski |
| 2,869,929 A | 1/1959 | Hurd |
| 3,006,658 A | 10/1961 | Wenham et al. |
| 3,078,124 A | 2/1963 | Mulder |
| 3,092,420 A | 6/1963 | Baldwin et al. |
| 3,215,384 A | 11/1965 | Chambers |

(Continued)

FOREIGN PATENT DOCUMENTS

| | | |
|---|---|---|
| EP | 542728 | 7/1988 |
| EP | 0309611 A1 | 4/1989 |

(Continued)

OTHER PUBLICATIONS

Notice of Allowance for U.S. Appl. No. 15/491,477, dated Dec. 28, 2018, 2 pgs.

(Continued)

*Primary Examiner* — Jason S Morrow
(74) *Attorney, Agent, or Firm* — Sprinkle IP Law Group

(57) ABSTRACT

A fairing assembly adapted to control flow proximate to a vehicle wheel, the fairing assembly having an aerodynamic outer surface to direct flow. The fairing assembly comprises a fairing having a fairing outboard surface. The assembly further comprises a fairing cap coupled to the fairing to cover at least a portion of the fairing outboard surface.

20 Claims, 13 Drawing Sheets

(56) References Cited

U.S. PATENT DOCUMENTS

| | | | |
|---|---|---|---|
| 3,276,502 A | 10/1966 | Walter |
| 3,276,503 A | 10/1966 | Kilmarx |
| 3,279,815 A | 10/1966 | Hutchens |
| 3,317,247 A | 5/1967 | Lamme |
| 3,367,722 A | 2/1968 | Miyanaga |
| 3,582,108 A | 6/1971 | Carlton |
| 3,585,824 A | 6/1971 | Schenk et al. |
| 3,874,697 A | 4/1975 | Thompson |
| 3,918,764 A | 11/1975 | Lamme |
| 3,954,281 A | 5/1976 | Juergens |
| 4,138,129 A | 2/1979 | Morris |
| 4,169,608 A | 10/1979 | Logan |
| 4,180,230 A | 12/1979 | Sogoian |
| 4,205,861 A | 6/1980 | Roberts |
| 4,235,476 A | 11/1980 | Arvidsson |
| 4,334,694 A | 6/1982 | Iwanicki |
| 4,441,539 A | 4/1984 | Hulse |
| 4,582,107 A | 4/1986 | Scully |
| 4,619,303 A | 10/1986 | Bryan et al. |
| 4,627,631 A | 12/1986 | Sherman |
| 4,640,331 A | 2/1987 | Braun et al. |
| 4,641,698 A | 2/1987 | Bitonti |
| 4,678,017 A | 7/1987 | Schultz |
| 4,706,980 A | 11/1987 | Hawes et al. |
| 4,724,879 A | 2/1988 | Schultz et al. |
| 4,730,952 A | 3/1988 | Wiley |
| 4,735,428 A | 4/1988 | Antekeier |
| 4,744,399 A | 5/1988 | Magnuson et al. |
| 4,754,792 A | 7/1988 | Braun et al. |
| 4,761,040 A | 8/1988 | Johnson |
| 4,784,430 A | 11/1988 | Biermacher |
| 4,836,568 A | 6/1989 | Preslik et al. |
| 4,860,579 A | 8/1989 | Beverly |
| 4,889,394 A | 12/1989 | Ruspa |
| 4,892,128 A | 1/1990 | Bartos |
| 4,895,199 A | 1/1990 | Magnuson et al. |
| 4,921,276 A | 5/1990 | Morin |
| 4,925,235 A | 5/1990 | Fingerle |
| 4,961,611 A * | 10/1990 | Patti ................ B60B 7/14 |
| | | 301/37.38 |
| D312,609 S | 12/1990 | Preslik et al. |
| D312,810 S | 12/1990 | Preslik et al. |
| 4,974,909 A | 12/1990 | Patti et al. |
| 4,984,851 A | 1/1991 | Hayano |
| 5,074,573 A | 12/1991 | Dick |
| 5,179,981 A | 1/1993 | Hickes et al. |
| 5,190,354 A | 3/1993 | Levy et al. |
| 5,192,108 A | 3/1993 | Richardson et al. |
| 5,238,268 A | 8/1993 | Logan |
| 5,240,039 A | 8/1993 | Colussi et al. |
| 5,257,822 A | 11/1993 | Metcalf |
| 5,263,770 A | 11/1993 | Goudey |
| 5,269,547 A | 12/1993 | Antekeier |
| 5,280,990 A | 1/1994 | Rinard |
| 5,286,049 A | 2/1994 | Khan |
| D345,332 S | 3/1994 | Roman |
| 5,294,189 A | 3/1994 | Price et al. |
| 5,324,099 A | 6/1994 | Fitzhugh |
| 5,340,154 A | 8/1994 | Scott |
| 5,366,278 A | 11/1994 | Brumfield |
| 5,375,882 A | 12/1994 | Koch, III |
| 5,398,743 A | 3/1995 | Bartos |
| D361,974 S | 9/1995 | Hornik |
| 5,465,772 A | 11/1995 | Sartor |
| 5,490,342 A | 2/1996 | Rutterman et al. |
| 5,584,949 A | 12/1996 | Ingram |
| 5,623,777 A | 4/1997 | Hsiao et al. |
| D381,949 S | 8/1997 | Barrett, Jr. et al. |
| 5,659,989 A | 8/1997 | Hsiao et al. |
| D395,268 S | 6/1998 | Tucker |
| 5,769,979 A | 6/1998 | Naedler |
| 5,791,741 A | 8/1998 | Sheu |
| 5,833,254 A | 11/1998 | Bucho |
| 5,836,399 A | 11/1998 | Maiwald et al. |
| 5,850,727 A | 12/1998 | Fox |
| 5,871,335 A | 2/1999 | Bartlett |
| 5,884,981 A | 3/1999 | Ichikawa |
| 5,938,222 A | 8/1999 | Huang |
| 5,947,520 A | 9/1999 | McHorse |
| 6,045,195 A | 4/2000 | Okamoto |
| 6,070,893 A | 6/2000 | Thorndyke et al. |
| 6,070,908 A | 6/2000 | Skrzypchak |
| 6,105,645 A | 8/2000 | Ingram |
| 6,120,104 A | 9/2000 | Okamoto et al. |
| 6,152,469 A | 11/2000 | Gadowski |
| 6,219,987 B1 | 4/2001 | Trent et al. |
| 6,244,316 B1 | 6/2001 | Naedler |
| 6,367,841 B1 | 4/2002 | Matthew |
| 6,401,743 B1 | 6/2002 | Naedler |
| 6,412,799 B1 | 7/2002 | Schrempf |
| 6,416,112 B1 | 7/2002 | Trivits |
| 6,427,739 B1 | 8/2002 | Medsker |
| 6,431,605 B1 | 8/2002 | Miller et al. |
| 6,435,462 B2 | 8/2002 | Hawes |
| 6,443,492 B1 | 9/2002 | Barr et al. |
| 6,443,529 B1 | 9/2002 | Williams |
| 6,648,373 B2 | 11/2003 | Hawes |
| 6,666,498 B1 | 12/2003 | Whitten |
| 6,698,482 B2 | 3/2004 | Hennig |
| 6,786,512 B2 | 9/2004 | Morin et al. |
| 6,857,709 B1 | 2/2005 | McLean et al. |
| 6,886,862 B2 | 5/2005 | Matthew |
| 6,979,050 B2 | 12/2005 | Browne et al. |
| 7,011,428 B1 | 3/2006 | Hand |
| 7,081,081 B2 | 7/2006 | Schutz et al. |
| 7,083,179 B2 | 8/2006 | Chapman et al. |
| 7,093,909 B1 | 8/2006 | Korpi et al. |
| 7,131,705 B1 | 11/2006 | DelVecchio et al. |
| 7,249,804 B2 | 7/2007 | Zank et al. |
| 7,466,049 B1 | 12/2008 | Vancea |
| 7,484,736 B2 | 2/2009 | Allemann et al. |
| 7,520,534 B2 | 4/2009 | Longchamp |
| 7,530,379 B1 | 5/2009 | Becker et al. |
| 7,547,076 B2 * | 6/2009 | Necaise ................ B60B 7/20 |
| | | 301/108.4 |
| D607,200 S | 1/2010 | Prater |
| 7,651,108 B2 | 1/2010 | Bonnaud et al. |
| 7,658,251 B2 | 2/2010 | James |
| 7,669,678 B2 | 3/2010 | Benedict et al. |
| 7,775,374 B1 | 8/2010 | Barker et al. |
| 7,775,604 B2 | 8/2010 | Chen |
| 7,806,464 B2 | 10/2010 | Cardolle |
| 7,909,343 B2 | 3/2011 | Archer et al. |
| 7,931,302 B2 | 4/2011 | Vaughn |
| 7,963,159 B2 | 6/2011 | Ingram et al. |
| 7,975,739 B1 | 7/2011 | Ingram |
| 8,011,848 B2 | 9/2011 | Sockman et al. |
| 8,028,732 B1 | 10/2011 | Ingram et al. |
| 8,118,329 B2 | 2/2012 | Braga |
| 8,251,436 B2 | 8/2012 | Henderson et al. |
| 8,342,595 B2 | 1/2013 | Henderon et al. |
| 8,353,375 B2 | 1/2013 | James |
| 8,382,210 B1 | 2/2013 | Fleck |
| 8,424,956 B2 | 4/2013 | Stimel |
| 8,517,474 B2 | 8/2013 | Salah |
| 8,567,802 B2 | 10/2013 | Barron |
| 8,746,305 B2 | 6/2014 | Lloyd |
| 8,747,084 B2 | 6/2014 | Richardson et al. |
| 8,763,661 B2 | 7/2014 | Richardson |
| 8,814,253 B1 * | 8/2014 | Butler ................ B62D 25/163 |
| | | 296/180.4 |
| 8,870,275 B1 | 10/2014 | Schmidt |
| 8,955,626 B2 | 2/2015 | Trueman |
| 9,027,983 B2 | 5/2015 | Butler et al. |
| 9,039,386 B2 | 5/2015 | Rcihardson et al. |
| 9,039,392 B2 | 5/2015 | Richardson et al. |
| 9,074,595 B2 | 7/2015 | Richardson |
| 9,080,565 B2 | 7/2015 | Richardson |
| 9,121,401 B2 | 9/2015 | Richardson |
| 9,145,887 B2 | 9/2015 | Richardson |
| 9,151,288 B2 | 10/2015 | Richardson |
| 9,222,473 B2 | 12/2015 | Richardson |
| 9,308,949 B1 | 4/2016 | Mihelic et al. |
| 9,321,302 B2 | 4/2016 | Fleck |

(56) References Cited

U.S. PATENT DOCUMENTS

| | | | |
|---|---|---|---|
| 9,327,550 | B2 | 5/2016 | Butler et al. |
| 9,429,243 | B2 | 8/2016 | Hessling et al. |
| 9,604,157 | B2 | 3/2017 | Richardson |
| 9,637,184 | B1* | 5/2017 | Bennett ................ B62D 35/001 |
| 9,663,157 | B2 | 5/2017 | Butler et al. |
| 9,821,598 | B2 | 11/2017 | Fleck |
| 9,868,318 | B2* | 1/2018 | Becker .................... B60B 7/006 |
| 1,025,275 | A1 | 4/2019 | Butler et al. |
| 1,029,387 | A1 | 5/2019 | Butler et al. |
| 1,034,345 | A1 | 7/2019 | Butler et al. |
| 10,482,565 | B1 | 11/2019 | Chen |
| 2002/0124926 | A1 | 9/2002 | Colussi et al. |
| 2004/0164539 | A1 | 8/2004 | Bernard |
| 2004/0238093 | A1 | 12/2004 | Nelson et al. |
| 2005/0133134 | A1 | 6/2005 | Ingram et al. |
| 2006/0179929 | A1 | 8/2006 | Becker |
| 2008/0257620 | A1 | 10/2008 | Poulsen |
| 2009/0273176 | A1 | 11/2009 | Ulgen |
| 2009/0283190 | A1 | 11/2009 | Padula et al. |
| 2010/0066123 | A1 | 3/2010 | Ortega et al. |
| 2010/0066155 | A1 | 3/2010 | Seradarian et al. |
| 2010/0117396 | A1 | 5/2010 | Dayton |
| 2011/0011656 | A1 | 1/2011 | Poulsen |
| 2011/0057410 | A1 | 3/2011 | Eklund et al. |
| 2011/0089748 | A1 | 4/2011 | Grill et al. |
| 2011/0101767 | A1 | 5/2011 | Fleck |
| 2011/0272963 | A1 | 11/2011 | Henderson et al. |
| 2011/0272964 | A1 | 11/2011 | Henderson et al. |
| 2012/0013146 | A1 | 1/2012 | Wolf et al. |
| 2012/0024445 | A1 | 2/2012 | Wilson et al. |
| 2012/0043803 | A1* | 2/2012 | Grill ..................... B60B 7/0013 301/37.26 |
| 2013/0015698 | A1 | 1/2013 | Butler et al. |
| 2013/0049320 | A1 | 2/2013 | Smith |
| 2013/0068361 | A1 | 3/2013 | Flory et al. |
| 2013/0076107 | A1* | 3/2013 | Starnes ..................... B60B 7/00 301/37.102 |
| 2013/0087262 | A1 | 4/2013 | Hennig |
| 2013/0199685 | A1 | 8/2013 | Nelson et al. |
| 2014/0117712 | A1 | 5/2014 | Butler et al. |
| 2014/0284994 | A1* | 9/2014 | Polka ........................ B60B 7/04 301/37.102 |
| 2015/0151569 | A1* | 6/2015 | Fleck ........................ B60B 7/02 301/37.42 |
| 2016/0141934 | A1 | 5/2016 | Click |
| 2016/0207352 | A1 | 7/2016 | Butler et al. |
| 2016/0221388 | A1* | 8/2016 | Van Oort ................. F16B 2/248 |
| 2016/0288590 | A1 | 10/2016 | Hennig et al. |
| 2017/0166266 | A1 | 6/2017 | Wall, II |
| 2017/0217507 | A1 | 8/2017 | Butler et al. |
| 2017/0240220 | A1 | 8/2017 | Kron |
| 2018/0072354 | A1 | 3/2018 | Cosme et al. |
| 2018/0297645 | A1 | 10/2018 | Butler et al. |
| 2019/0031251 | A1 | 1/2019 | Butler et al. |
| 2019/0061838 | A1* | 2/2019 | Lee ...................... B62D 35/001 |
| 2019/0193797 | A1 | 6/2019 | Butler et al. |
| 2019/0270335 | A1 | 9/2019 | Butler |

FOREIGN PATENT DOCUMENTS

| | | |
|---|---|---|
| EP | 0310130 A1 | 4/1989 |
| GB | 2348400 | 10/2000 |
| GB | 2524173 | 9/2016 |
| WO | WO 97/48590 | 12/1997 |
| WO | WO 2004/062953 | 7/2004 |
| WO | WO 2008/100338 | 8/2008 |
| WO | WO 2013/174410 | 11/2013 |
| WO | WO 2016/134847 | 9/2016 |
| WO | WO 2018/136529 | 7/2018 |

OTHER PUBLICATIONS

Notice of Allowance for U.S. Appl. No. 16/018,413, dated Feb. 6, 2019, 5 pgs.

Office Action for U.S. Appl. No. 15/553,893, dated Feb. 25, 2019, 6 pgs.

Notice of Allowance for U.S. Appl. No. 15/082,996, dated Feb. 26, 2019, 4 pgs.

Office Action for U.S. Appl. No. 16/290,631, dated Jun. 25, 2019, 7 pgs.

Office Action for European Patent Application No. 12811575.5, dated Jun. 28, 2019, 6 pgs.

Vigia Tire Pressure Systems brochure, Colven, retrieved from http://www.vigia.ca/images/Pdf/Vigia_external_brochure.pdf, captured Nov. 5, 2017, 4 pgs.

Non-patent literature illustrating parts_hollow.jpg, Colven, retrieved from http://vigia.ca/webshop/images/categories/parts_hollow.jpg, captured Nov. 5, 2017, 1 pg.

International Search Report issued for PCT Application No. PCT/US17/60242, dated Mar. 1, 2018, 4 pgs.

Written Opinion issued for PCT Application No. PCT/US17/60242, dated Mar. 1, 2018, 6 pgs.

Bresnan, Exterior Accessories, Drink Water Trailer Sales, May 11, 2012, Pembroke, MA, retrieved from http://www.drinkwaterts.com on Jul. 25, 2012, 23 pages.

Truck Accessories, Council Hitch Truck Accessories, Council Bluffs, IA, retrieved from http://councilhitch.com/vehicle-accessories/truck-accessories/ on Jul. 24, 2012, 1 page.

AMP Research PowerStep™, AMP Research, 2011, Tustin, CA, retrieved from http://www.amp-research.com/products/truckaccessories/powerstep/ on Jul. 24, 2012, 6 pages.

TrailBack Aluminium Running Boards, BuyAutoTruckAccessories.com, 2012, Clifton, NJ, retrieved from http://www.buyautotruckaccessories.com on Jul. 24, 2012, 2 pages.

Discount Auto Parts Dee Zee Running Boards Car Truck SUV, Dee Zee, Inc., Des Moines, IA, retrieved from http://www.running-board.nedona.org on Jul. 24, 2012, 6 pages.

Lund Trailrunner Extruded Aluminum Running Boards, JC Whitney, 2012, LaSalle, IL, retrieved from http://www.jcwhitney.com on Jul. 25, 2012, 3 pages.

Endeavor Running Boards, 4WheelOnline.com, Tampa, FL, retrieved from http://4wheelonline.com/EndeavourRunningBoards.64146 on Jul. 28, 2012, 2 pages.

Deflecktor®, The First-Of-Its-Kind Aerodynamic Wheel Cover, A de F, Ltd., Birchwood, MN, retrieved from http://www.deflecktor.com/DeflecktorBrochure.pdf, 15 pages.

International Search Report and Written Opinion issued for PCT Application No. PCT/US2012/046010, completed Sep. 11, 2012 and dated Oct. 1, 2012, 10 pages.

Office Action for U.S. Appl. No. 13/452,249, dated Apr. 19, 2013, 11 pages.

Truck Accessories, Council Hitch Truck Accessories, Council Bluffs, IA, retrieved from http://councilhitch.com/vehicle-accessories/truck-accessories/ on May 15, 2013, 5 pages.

Office Action for U.S. Appl. No. 13/452,249, dated Sep. 9, 2013, 9 pages.

International Preliminary Report on Patentability (Ch. I) for International Application No. PCT/US2012/046010, dated Jan. 23, 2014, 9 pages.

International Search Report and Written Opinion for International Patent Application No. PCT/US13/68119, dated Jun. 5, 2014, 10 pages.

Isuzu NPR Splash Shield/Mud Flap 1989-Up, Busbee's Trucks & Parts Product Information Page, BusbeeTruckParts's Photostream, Flickr, uploaded Nov. 12, 2010, retrieved from www.flickr.com/photos/busbeetruckparts/5169791014/in/photostream/ on Feb. 25, 2014, 1 page.

Office Action for U.S. Appl. No. 14/070,294, dated Sep. 17, 2014, 8 pages.

(56) References Cited

OTHER PUBLICATIONS

Extended European Search Report for Application No. EP 12811575.5, dated Mar. 4, 2015, 8 pages.
Office Action for U.S. Appl. No. 13/545,100, dated Apr. 10, 2015, 15 pages.
International Preliminary Report on Patentability (Ch. I) for Application No. PCT/US2013/068119, dated May 14, 2015, 7 pages.
Office Action for U.S. Appl. No. 13/545,100, dated Sep. 21, 2015, 8 pages.
Office Action for U.S. Appl. No. 14/666,019, dated Jul. 8, 2016, 7 pages.
Extended European Search Report for Application No. EP 13851505.1, dated Oct. 14, 2016, 8 pages.
Examination Report issued for Australian Application No. 2013337652, dated Jan. 13, 2017, 4 pages.
Office Action for U.S. Appl. No. 15/082,996, dated Apr. 3, 2018, 25 pages.
Office Action issued for Canadian Application No. 2,877,482, dated May 14, 2018, 4 pages.
Office Action for U.S. Appl. No. 15/491,477, dated Aug. 14, 2018, 7 pgs.
Office Action for U.S. Appl. No. 15/553,893, dated July 19, 2018, 7 pgs.
Office Action for U.S. Appl. No. 16/018,413, dated Sep. 18, 2018, 6 pgs.
Office Action for U.S. Appl. No. 15/082,996, dated Nov. 2, 2018, 6 pgs.
Office Action for U.S. Appl. No. 16/290,631, dated Oct. 2, 2019, 9 pgs.
Notice of Allowance for U.S. Appl. No. 15/553,893, dated Sep. 10, 2019, 2 pgs.
Office Action for U.S. Appl. No. 16/049,367, dated Dec. 12, 2019, 6 pgs.

\* cited by examiner

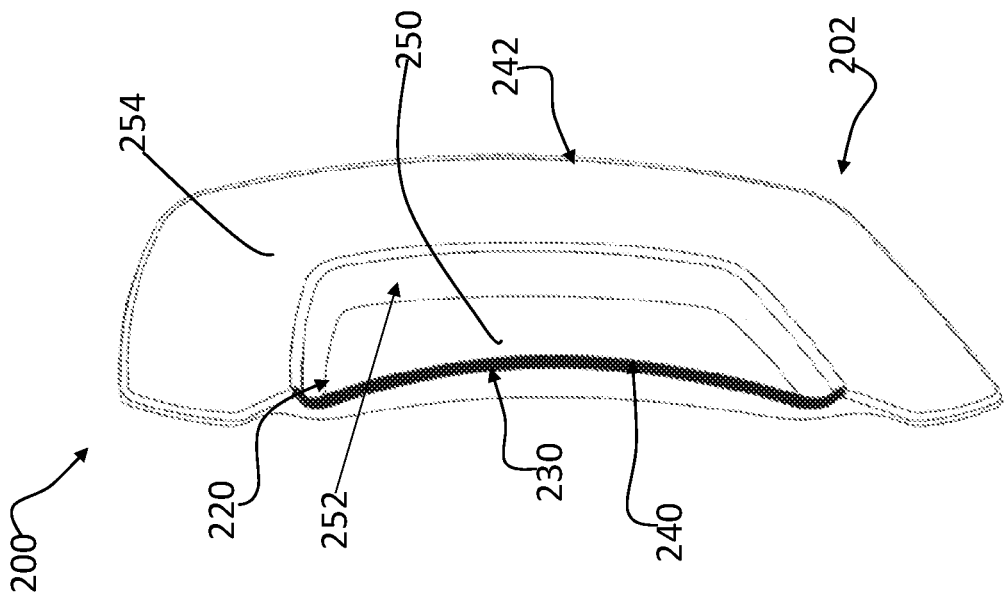
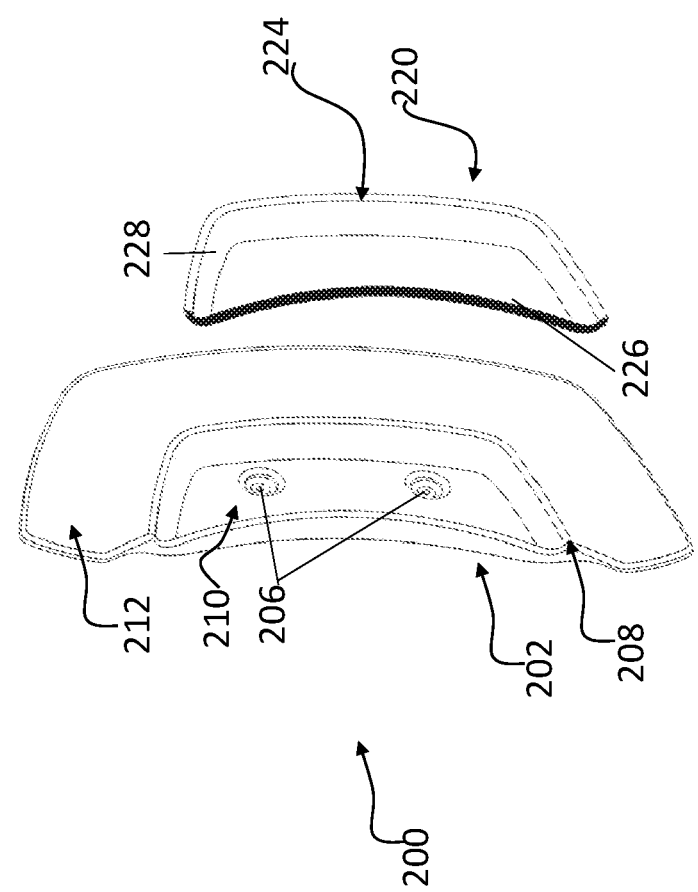

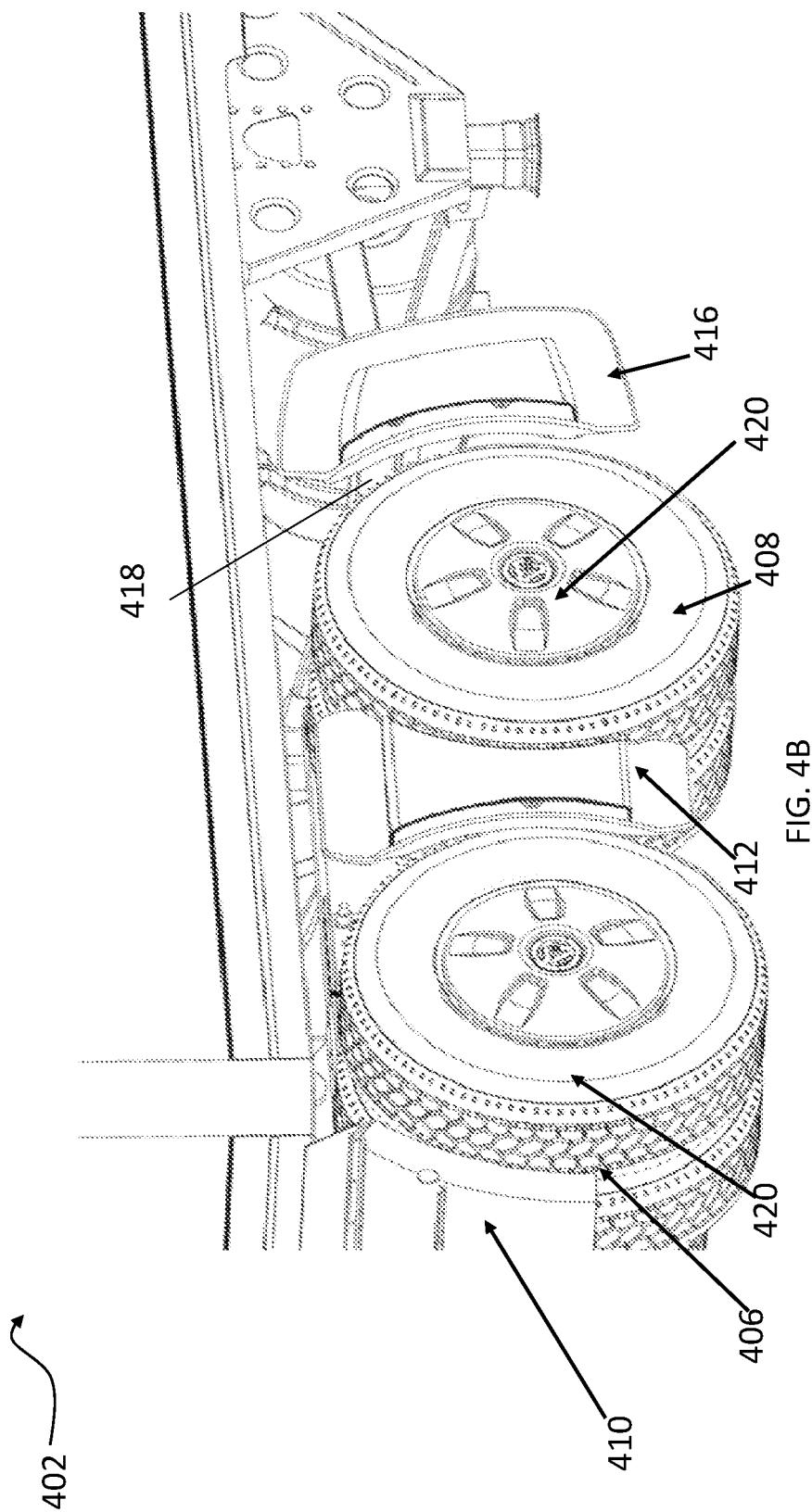

AERODYNAMIC SYSTEMS AND FAIRINGS WITH FAIRING CAPS

RELATED APPLICATIONS

This application claims the benefit of priority under 35 USC § 119(e) to U.S. Provisional Patent Application No. 62/524,528," entitled "Aerodynamic System and Adjustable Fairings," filed Jun. 24, 2017, by Joshua Butler and Kyle Walker and to U.S. Provisional Patent Application No. 62/538,791, entitled "Aerodynamic System and Adjustable Fairings," filed Jul. 30, 2017, by Joshua Butler and Kyle Walker, both of which are fully incorporated by reference herein in their entireties for all purposes.

TECHNICAL FIELD

This disclosure relates to aerodynamic systems for vehicles. More particularly, this disclosure relates to aerodynamic fairings for vehicles. Even more particularly, embodiments relate to aerodynamic fairings for large vehicles such as tractor trailers.

BACKGROUND

Large vehicles such as semitrailer trucks may easily travel several thousand miles each month, including on highways and other routes which allow for higher speeds. Poor aerodynamics cause a decrease in fuel economy and an increase in operating cost.

Various types of aerodynamic systems have been devised for reducing vehicle drag, including fairings—that is, external panels or structures added to vehicles to increase streamlining and reduce drag—that are positioned to control airflow. U.S. Pat. Nos. 9,027,983 and 9,663,157, both of which are fully incorporated herein by reference for all purposes, describe aerodynamic fairing systems that include a quarter fender fairing assembly, a middle or tandem fairing assembly and a rear fairing assembly. The quarter fender fairing assembly mounts forward of the truck tractor's non-steered wheels, the tandem (or middle) fairing assembly mounts to the tractor between the tandem wheels and the rear fairing assembly mounts to the tractor behind the rear tandem wheels. Each fairing assembly includes a mounting arm that mounts to the tractor frame and one or more panels that mount to the support arm. The panels are shaped to produce a desired aerodynamic flow.

In practice, the manner in which fairings mount to support arms leaves the mounting hardware exposed when the vehicle is viewed from the side. In addition to poor aesthetics, the exposed mounting hardware may lead to poor airflow at the mounting hardware. As another shortcoming, the mounting hardware may get damaged over time by road debris.

SUMMARY OF THE DISCLOSURE

Embodiments described herein provide systems and methods for improving the aerodynamics of vehicles, including large vehicles that are commonly seen pulling cargo trailers on highways, and which are generally referred to as "semis," "18-wheelers," "tractor trailers," and the like. Embodiments may also be beneficial on other vehicles as well.

One embodiment comprises a fairing assembly adapted to control flow proximate to a vehicle wheel, the fairing assembly having an aerodynamic outer surface to direct flow in, for example, a rearward angle or other desired angle. The fairing assembly comprises a fairing having a fairing outboard surface. The assembly further comprises a fairing cap coupled to the fairing to cover at least a portion of the fairing outboard surface. According to one embodiment, the fairing may define a hardware opening running from an outboard side through the fairing, the hardware opening adapted to accommodate mounting hardware used to mount the fairing to a support structure. The fairing cap can be adapted to cover the hardware opening from the outboard side.

According to one embodiment, the fairing cap comprises a fairing cap outboard surface. The fairing cap outboard surface can cooperate with the fairing outboard surface to provide the aerodynamic outer surface of the fairing assembly. The fairing cap may have an inner side surface shaped to conform to an outboard surface of the fairing. For example, the fairing cap may be shaped to fit in a recess, such as an inset, in the outboard surface of the fairing so that the fairing cap may be positioned in the recess. The outboard surface of the fairing cap and the outboard surface of the fairing can cooperate to provide a fairing assembly outer surface.

In another embodiment, the fairing cap forms a duct adapted to direct flow. More particularly, in one embodiment, the fairing cap acts in cooperation with the outboard surface of the fairing to create the duct. For example, the fairing cap may comprise an upper fairing cap wall, a lower fairing cap wall and a sidewall extending from the upper fairing cap wall to the lower fairing cap wall. The fairing cap may be coupled to the fairing in a manner such that the sidewall has an inner side surface (inboard surface) that is spaced from and faces the fairing outboard surface. The fairing cap walls and fairing can cooperate to form the duct between the fairing cap and fairing.

The fairing cap may comprise a hinge. A portion of the fairing cap is rotatable about the hinge to reveal a portion of the outboard surface of the fairing. For example, the portion of the fairing cap may be rotatable to reveal the portion of the fairing through which mounting hardware passes.

The fairing cap may be coupled to the fairing in a variety of manners. The fairing cap may be adhered to the outboard surface of the fairing. In addition or in the alternative, the fairing cap may be captured in a recess of the fairing by a geometric feature. In one embodiment, the fairing may include geometric features to capture the inboard end of the fairing cap upper and lower walls. In one embodiment, the fairing cap may attach to the mounting hardware that is used to mount the fairing to the support structure.

According to one embodiment, the fairing and fairing cap are formed of different materials. For example, the fairing cap may be formed of a more rigid material than the fairing. Even more particularly, in one embodiment, the fairing is molded from one or more polymers and the fairing cap is separately formed of a more rigid polymer or a metal.

Another embodiment comprises a method for mounting a wheel fairing. The method may include mounting a fairing to a support arm where the fairing has a fairing outboard surface with a hardware opening to accommodate mounting hardware. The method may further include coupling a fairing cap to the fairing to cover the hardware opening from the outboard side and to form a fairing assembly. The fairing assembly may have an aerodynamic outer surface to direct flow in a rearward angle. The method may further include positioning the fairing assembly proximate to a wheel of a vehicle.

Coupling the fairing cap to the fairing can include placing the fairing cap in a recess defined by the fairing outboard surface. For example, the fairing cap may be placed in a recess (e.g., an inset) defined by the fairing outboard surface. The fairing cap may have an inner side surface shaped to conform to the fairing outboard surface. Coupling the fairing cap to the fairing may include adhering the fairing cap to the outboard surface of the fairing with an adhesive. Coupling the fairing cap to the fairing may include catching a portion of the fairing cap with a geometric feature of the fairing. Coupling the fairing cap to the fairing comprises coupling the fairing cap to the fairing such that a fairing cap outboard surface cooperates with the fairing outboard surface to provide the aerodynamic outer surface. Coupling the fairing cap to the fairing may comprise forming a duct configured to direct air flow.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein:

FIG. 2A is an exploded view of one embodiment of a fairing assembly;

FIG. 2B is a perspective view of the embodiment of FIG. 2A;

FIG. 4B is a diagrammatic representation of another view of the aerodynamic system of FIG. 4A;

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide systems and methods for improving the aerodynamics of vehicles, including large vehicles that are commonly seen pulling cargo trailers on highways, and which are generally referred to as "semis", 18-wheelers," "tractor trailers" and the like and may be beneficial on other vehicles as well. Embodiments may be particularly suited for reducing drag, reducing or otherwise controlling the generation or distribution of spray/splash or improving the stability of large vehicles in an airstream.

Figure 1A:
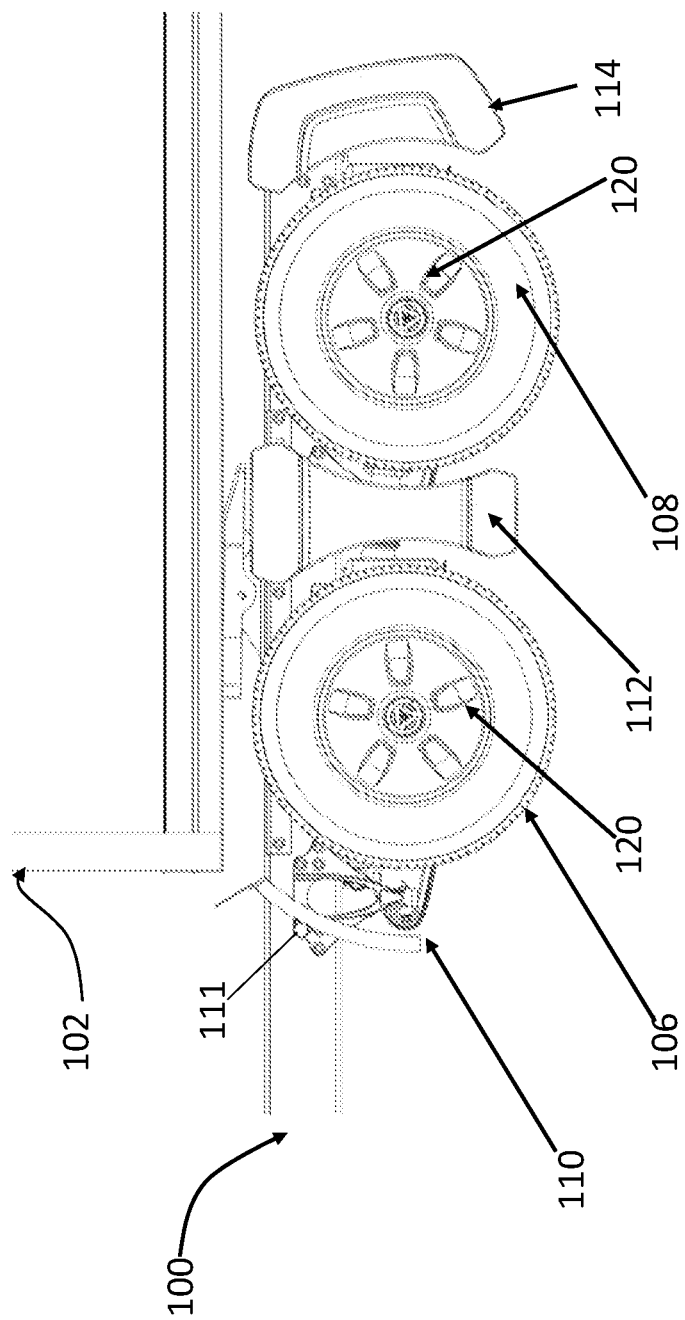
FIG. 1A is a diagrammatic representation of one embodiment of an aerodynamic system.
Figure 1B:
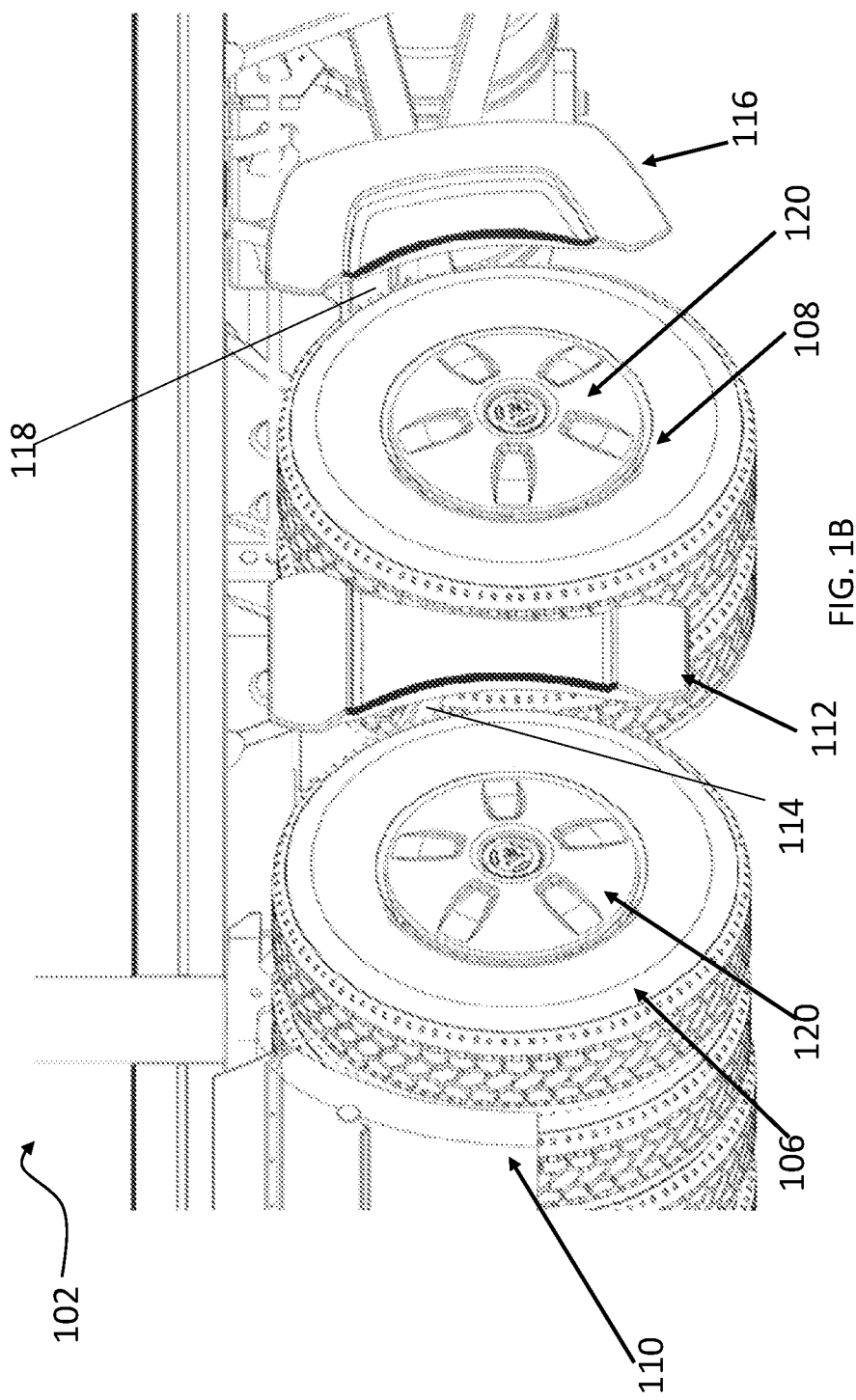
FIG. 1B is a diagrammatic representation of another view of the aerodynamic system of FIG. 1A.

FIG. 1A illustrates a side view of an aerodynamic system mounted to a truck tractor 100 and FIG. 1B illustrates another view of the aerodynamic system mounted to the truck tractor 100. A portion of trailer 102 is also depicted. In the illustrated embodiment, the truck tractor 100 includes forward tandem tires 106 and rear tandem tires 108. The aerodynamic system includes a quarter fender 110 mounted to a support 111 in front of front tandem wheels 106, a tandem or middle fairing assembly 112 mounted to the tractor 100 by support 114 that passes between the tandem tires 106, 108 and a rear fairing assembly 116 mounted to the tractor 100 by a support 118 behind the rear tandem wheels 108. The mounting hardware to mount fairing assemblies 112 and 116 to supports 114, 118 is protected from the outboard side by fairing caps.

A standard quarter fender in a standard location is shown installed in the figures. An aerodynamic quarter fender fairing may also be used with the aerodynamic system (instead of or in addition to the standard quarter fender). Examples of aerodynamic quarter fender fairings are described in U.S. Pat. No. 8,814,253, entitled "Aerodynamic Quarter Fender Assembly and Construction Method," by inventors Joshua Butler, et al., which is fully incorporated as part of this disclosure for all purposes. Quarter fender 110 and fairing assemblies 112, 116 are adapted to mount proximate to the wheels of a vehicle to control airflow proximate to the wheels. Wheel covers 120, which mount directly to the wheels, may provide a substantially smooth surface flush with an outer sidewall of the tires or may provide another aerodynamic profile. Examples of aerodynamic wheel covers are described in U.S. patent application Ser. No. 13/545,100, entitled "Aerodynamic Wheel Covers and Mounting Assemblies," by inventors Joshua Butler, et al., which is fully incorporated as part of this disclosure for all purposes.

In operation, airflow is directed around forward tandem tires 106 by a quarter fender fairing 110, passes by a first tire, passes over the outboard surface of middle fairing assembly 112, passes by a rear tandem tire 108 and passes over the outboard surface of rear fairing assembly 116. The aerodynamic system can facilitate a smooth transition behind tires 108 and extend the airflow in a direction substantially parallel with the outer sidewall of the tandem tires or direct the airflow out (i.e., away from the frame rail). Additionally, embodiments of an aerodynamic system may direct airflow parallel with the ground, in a downward direction or an upward direction as desired.

FIG. 2A is an exploded view of an embodiment of a rear fairing assembly 200 and FIG. 2B is an assembled view of fairing assembly 200. Rear fairing assembly 200 may be an example of rear fairing assembly 116. Rear fairing assembly 200 comprises fairing 202 and a fairing cap 220.

In general, fairing 202 and fairing assembly 200 have a generally thin lateral profile and a much larger longitudinal profile, providing a surface area to promote streaming. The outboard surface of fairing assembly 200 may form an aerodynamic outer surface that provides attached flow for longitudinal air flow (air flow streaming back as the vehicle moves forward) and can direct flow in a longitudinal angle such as parallel to the longitudinal axis of the vehicle, primarily back and inwards or back and outwards. Preferably, the fairing assembly has a sufficient projected surface area (in view from the side of the vehicle) to promote attached flow.

Rear fairing 202 comprises a mounting portion 210 and an outer periphery portion 212. In the embodiment illustrated, outer periphery has a c-shape about mounting portion 210. However, outer periphery portion 212 may have other shapes. Mounting portion 210 provides a mounting area for rear fairing 202 and can include features, such as ribs or other features, to increase the rigidity of rear fairing 202 around the mounting area. Rear fairing assembly 200 mounts to a support structure that, in turn, mounts to the vehicle frame. The support structure may include a support arm (e.g., support arm 118), adapter plate or other structures. Examples of support arms include, but are not limited to support arms for mud flap fairings as described in U.S. Pat. Nos. 9,027,983 and 9,663,157. Furthermore, according to one embodiment, rear fairing 202 can be a mud flap fairing as described in U.S. Pat. Nos. 9,027,983 and 9,663,157. In the illustrated embodiment, mounting portion 210 includes a hardware opening running from the outboard surface of mounting portion 210 and inboard through fairing 202 to accommodate the mounting hardware used to mount the fairing assembly to a support structure. For example, fairing 202 includes an array of fastener openings 206 through which fasteners, such as bolts, screws or other fasteners, may be inserted so that rear fairing 202 can be attached to the support structure. The openings may be spaced so that rear fairing 202 can be attached to a fairing adapter plate as described, for example, in U.S. Pat. Nos. 9,027,983 and 9,663,157. In addition or in the alternative, the mounting fasteners and associated fastener openings may also be located on a sidewall of the fairing, the inner surface of the fairing, or another location on the fairing.

The outboard surface of outer periphery portion 212 may be in the same plane as, inset from or be more outboard from the outboard surface of mounting portion 210. In the embodiment illustrated, the outboard surface of mounting portion 210 is inset from the outboard surface of outer periphery portion 212 to form an inset. Thus, in the illustrated embodiment, the outboard ends of fastener openings 206 are located in a recess formed by the shape of the outboard surface of rear fairing 202.

Rear fairing cap 220 can be coupled to rear fairing 202 to cover, from the outboard side, the fasteners that hold rear fairing 202 to the support structure. In the embodiment illustrated, fairing cap 220 comprises a sidewall 226 and peripheral wall 228 that extends outboard from the sidewall 226. In the embodiment illustrated, the inner side surface of fairing cap 220 that faces the outboard surface of fairing 202 is shaped to conform to the outboard surface of fairing 202 at mounting section 210 (e.g., to fit the shape of the recess so that fairing cap 220 can be positioned in the recess).

Fairing cap 220 may be attached to rear fairing 202 in a variety of manners. In one embodiment, the inner side surface of cap 220 is adhered to rear fairing 202. In another embodiment, rear fairing 202 and fairing cap 220 include geometric features (e.g., tongue and groove fittings, indents, detents, catches or other features) to allow fairing cap 220 to attach to rear fairing 202. Other types of interference fit methods known in the art used to couple plastic parts together, plastic and metal parts together or other parts may also be employed. For example, during assembly, wall 228 may flex to allow the top, bottom and lower portions of the outboard cap edge 224 to fit past and then snap-fit to the inboard side of a lip 208 disposed about the top, rear and bottom outboard edges of the recess. In another embodiment, the heads of the fasteners used to attach rear fairing 202 to the support arm may have features to accept the clips and cap 220 may comprise clips or geometric features that project inboard to be received by the heads of the fasteners. The clips may be inserted in the heads of the fasteners to couple cap 220 to the support arm and thus form fairing assembly 200.

Fairing assembly 200, when assembled, comprises a center portion 230 about which outer periphery portion 212 is disposed. The center portion 230 is formed by mounting portion 210 of fairing 202 and cap 220. Through the selection of shape or materials, the outer periphery may be more flexible than the center portion 230 to absorb impacts from the ground or trailer. According to one embodiment, for example, fairing 202 can be formed such that outer periphery portion 212 is more flexible than mounting portion 210. In addition or in the alternative, fairing cap 220 may formed of a more rigid material than fairing 202 and thus provide increased stiffness to the fairing assembly, including but not limited to providing stiffness at the center portion 230.

Fairing assembly 200 has a leading edge 240 and a trailing edge 242. Leading edge 240 may have a curved portion for accommodating the profile of a wheel. The fairing assembly 200 may be shaped to have a continuous aerodynamic outboard surface from leading edge 240 to trailing edge 242 to promote attached flow across the surface. More particularly, the outboard surface of the fairing cap 220 and fairing 202 can cooperate to provide the aerodynamic outer surface of fairing assembly 200. According to one embodiment, the fairing assembly may be shaped to have an outboard surface with a first, more inboard portion 250, a transition area 252, and a second, more outboard, surface portion 254. In the illustrated embodiment, the first surface portion 250 is formed as a relatively flat surface, transition area 252 is formed as a discrete or stepped transition zone transitioning from first surface portion 250 to second surface portion 254, and second surface portion 254 is formed as an angled or curved outward surface. The fairing assembly may include more or fewer surfaces, areas or zones as needed and in some embodiments may have flat outer surfaces. Curves may be compound or simple, and stepped areas may include more than one step.

Figure 3B:
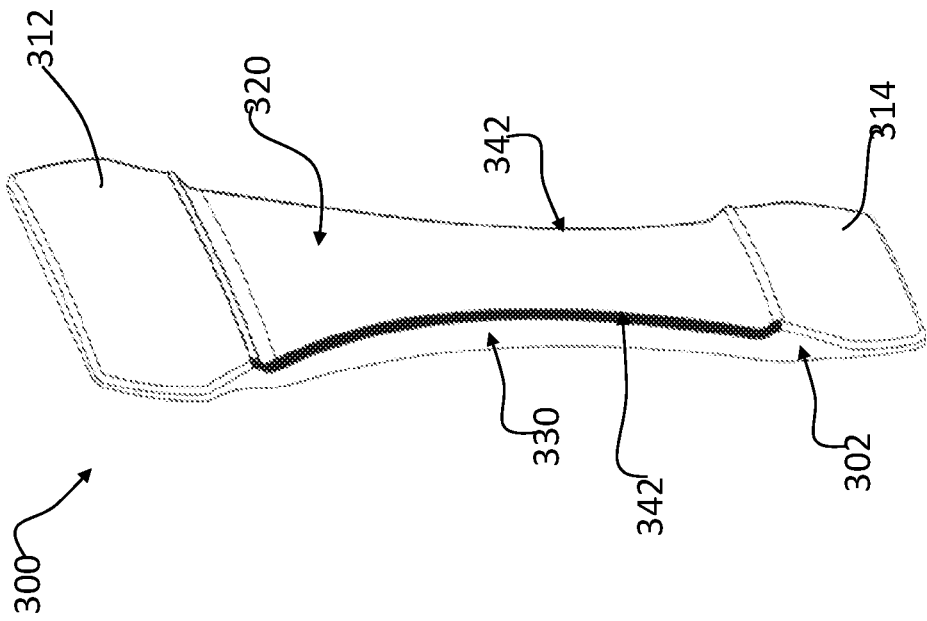
FIG. 3B is perspective view of the embodiment of FIG. 3A.
Figure 3A:
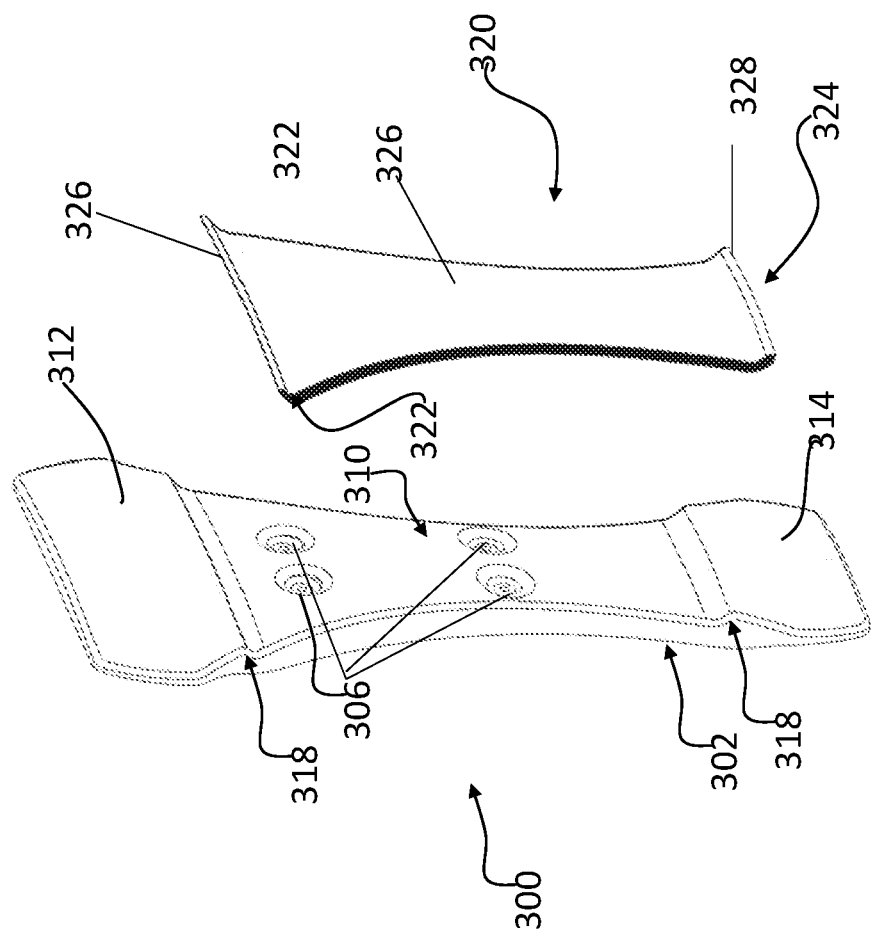
FIG. 3A is an exploded view of another embodiment of a fairing assembly.

FIG. 3A is an exploded view of an embodiment of a middle fairing assembly 300 and FIG. 3B is an assembled view of fairing assembly 300. Middle fairing assembly 300 can be an example of middle fairing assembly 112.

Middle fairing assembly 300 comprises a middle fairing 302 and a fairing cap 320. Middle fairing assembly 300 may be shaped to ensure air flow stays outboard of the tires on the rear tandem axle (i.e., may reduce or prevent air flow from entering the space between the front axle tires and the rear axle tires). The middle fairing assembly 300 may also contain other aerodynamic features such as vents, ribs, or other features, for reducing drag and controlling splash and spray, or providing ventilation for dissipating heat.

In FIG. 3A, middle fairing 300 comprises a center portion 310, an upper portion 312 and a lower portion 314. Center portion 310 provides a mounting area for middle fairing 302 and can include features, such as ribs or other features, to increase the rigidity of middle fairing 302 around the mounting area. The outboard surface of one or more of the upper and lower portions 312, 314 may be in the same plane as, inset from or be more outboard from the outboard surface of center portion 310. In the embodiment illustrated, the outboard surface of center portion 310 is inset from the outboard surface at upper portion 312 and lower portion 314 to form a recess.

Middle fairing assembly 300 mounts to a support structure that, in turn, mounts to the vehicle frame and spans between tires on a front tandem axle and tires on a rear tandem axle. The support structure may include a support arm (e.g., support arm 114), adapter plate or other support structure. Examples of support arms include, but are not limited to middle fairing support arms described in U.S. Pat. Nos. 9,027,983 and 9,663,157, both of which are fully incorporated herein by reference for all purposes. Further, middle fairing 302 may be a middle fairing formed according to U.S. Pat. Nos. 9,027,983 and 9,663,157. Center portion 310 includes a hardware opening running from the outboard surface of center portion 310 and inboard through fairing 302 to accommodate the mounting hardware used to mount the fairing assembly to a support structure. For example, center portion 310 includes an array of fastener openings 306 through which fasteners, such as bolts, screws or other fasteners, may be inserted so that middle fairing 302 can be attached to the support arm. The openings may be spaced so that the middle fairing can be attached to a fairing adapter plate as described, for example, in U.S. Pat. Nos. 9,027,983 and 9,663,157. The outboard ends of fastener openings 306 may be located in a recess (e.g., a pocket or other recess) formed by the shape of the outboard surface of middle fairing 302. In addition or in the alternative, the mounting fasteners and associated fastener openings may also be located on a sidewall of the fairing, the inner surface of the fairing, or another location on the fairing.

Fairing cap 320 can be coupled to middle fairing 302 to cover, from the outboard side, the fasteners that hold middle fairing 302 to the support arm. In the embodiment illustrated, fairing cap 320 comprises a sidewall 326 and upper and lower walls 322, 324 that extend outboard from the sidewall 326. The inner surface of fairing cap 320 that faces the outboard surface of fairing 302 is shaped to conform the outboard surface of fairing 302 at middle section 310 (e.g., to fit the shape of the recess so that fairing cap 320 can be positioned in the recess).

Fairing cap 320 may be attached to middle fairing in a variety of manners. In one embodiment, the inboard surface of cap 320 is adhered to middle fairing 302. In another embodiment, middle fairing and fairing cap 320 may include geometric features (e.g., tongue and groove fittings, indents, detents, catches or other features) to allow fairing cap 320 to attach to middle fairing 302. For example, during assembly, walls 322, 324 may flex to allow the top and bottom outboard edges 326, 328 to fit past and then snap-fit to the inboard side of lips 318 disposed about the top, rear and bottom outboard edges of the recess. In another embodiment, the heads of the fasteners used to attach middle panel 302 to the support arm may have features to accept the clips and cap 320 may comprise clips that project inboard to be received by the heads of the fasteners. The clips may be inserted in the heads of the fasteners to couple cap 320 to the support arm and thus form fairing assembly 300.

Fairing assembly 300, when assembled, comprises a center portion 330 formed by center portion 310 and cap 320, an upper portion 312 and a lower portion 314. Through the selection of shape or materials, the upper portion 312 and lower portion 314 may be more flexible than the center portion 330 to absorb impacts from the ground or trailer. According to one embodiment, for example, fairing 302 can be formed such that upper portion 312 and lower portion 314 are more flexible than center portion 310. In addition or in the alternative, fairing cap 320 may formed for a more rigid material than fairing 302 and thus provide increased stiffness at center portion 330.

In the embodiment illustrated in FIG. 3B, fairing assembly 300 forms an aerodynamic outboard surface between a leading edge 340 and a trailing edge 342 that promotes attached rearward flow (when the vehicle is moving forward). More particularly, the outboard surfaces of the fairing cap 320 and fairing 302 cooperate to provide the aerodynamic outer surface of fairing assembly 300. In some cases, the outer surface may direct the flow rearward or rearward and slightly inward or outward. The outer surface may have a variety of profiles including flat, curved outward toward the rear, or other profile. According to one embodiment, leading edge 340 may be curved to substantially conform to the shape of a tire forward of assembly 300 and trailing edge 342 may have a curved shape to conform to the shape of tire to the rear of assembly 300.

Figure 4A:
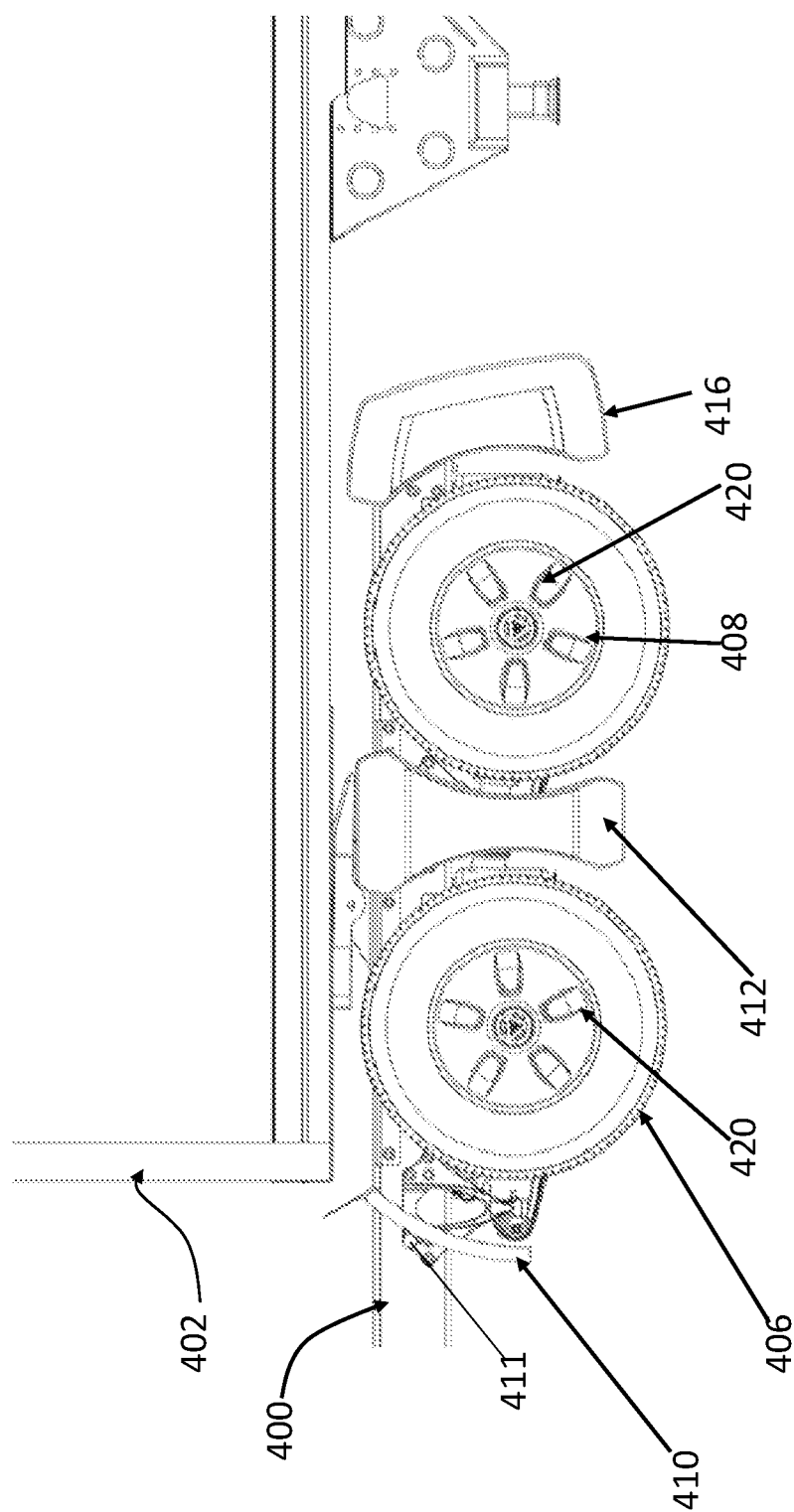
FIG. 4A is a diagrammatic representation of another embodiment of an aerodynamic system.

FIG. 4A illustrates a side view of another embodiment of an aerodynamic system mounted to a truck tractor 400 and FIG. 4B illustrates another view of the aerodynamic system mounted to the truck tractor 400. A portion of trailer 402 is also depicted. In the illustrated embodiment, the truck tractor 400 includes tandem front tires 406 and rear tires 408. The aerodynamic system includes a standard quarter fender 410 mounted to a support 411 in front of front tandem tires 406, a middle fairing assembly 412 mounted to the tractor 400 by a support that passes between the tandem tires 406, 408 and a rear fairing assembly 416 mounted to the tractor 400 by a support 418 behind the rear tandem tires 408. The mounting hardware to mount fairing assemblies 412 and 416 to the supports is protected from the outboard side by fairing caps that form inlet air ducts to control air flow.

A standard quarter fender in a standard location is shown installed in the figures. An aerodynamic quarter fender fairing may also be used with the aerodynamic system (instead of or in addition to the standard quarter fender). Examples of aerodynamic quarter fender fairings are described in U.S. Pat. No. 8,814,253, entitled "Aerodynamic Quarter Fender Assembly and Construction Method," by inventors Joshua Butler, et al., which is fully incorporated as part of this disclosure for all purposes. Quarter fender 410 and fairing assemblies 412, 416 are adapted to mount proximate to the wheels of a vehicle to control airflow proximate to the wheels. Wheel covers 420, which mount directly to the wheels, may provide a substantially smooth surface flush with an outer sidewall of the tires or may provide another aerodynamic profile. Examples of aerodynamic wheel covers are described in U.S. patent application Ser. No. 13/545,100, entitled "Aerodynamic Wheel Covers and Mounting Assemblies," by inventors Joshua Butler, et al., which is fully incorporated as part of this disclosure for all purposes.

In operation, airflow is directed around forward tandem tires 406 by a quarter fender fairing (if utilized), passes by a first tire, passes over the outboard surface of middle fairing assembly 412 and through the duct of middle fairing assembly 412, passes by a rear tandem tire 408 and passes over the outboard surface of rear fairing assembly 416 and through the duct of rear fairing assembly 416. The aerodynamic system can facilitate a smooth transition behind tires 408 and extend the airflow in a direction substantially parallel with the outer sidewall of the tandem tires or direct the airflow out (i.e., away from the frame rail). Additionally, embodiments of an aerodynamic system may direct airflow parallel with the ground, in a downward direction or an upward direction as desired.

Figure 5B:
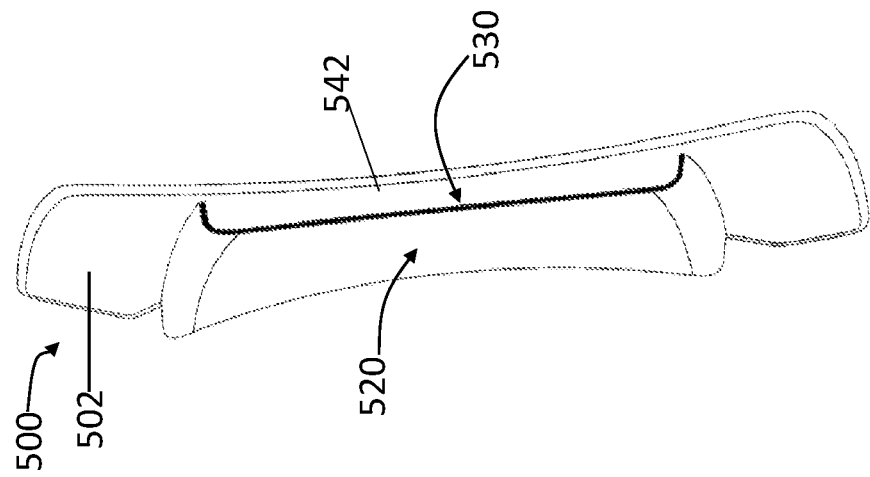
FIG. 5B is a perspective view of the embodiment of FIG. 5A.
Figure 5A:
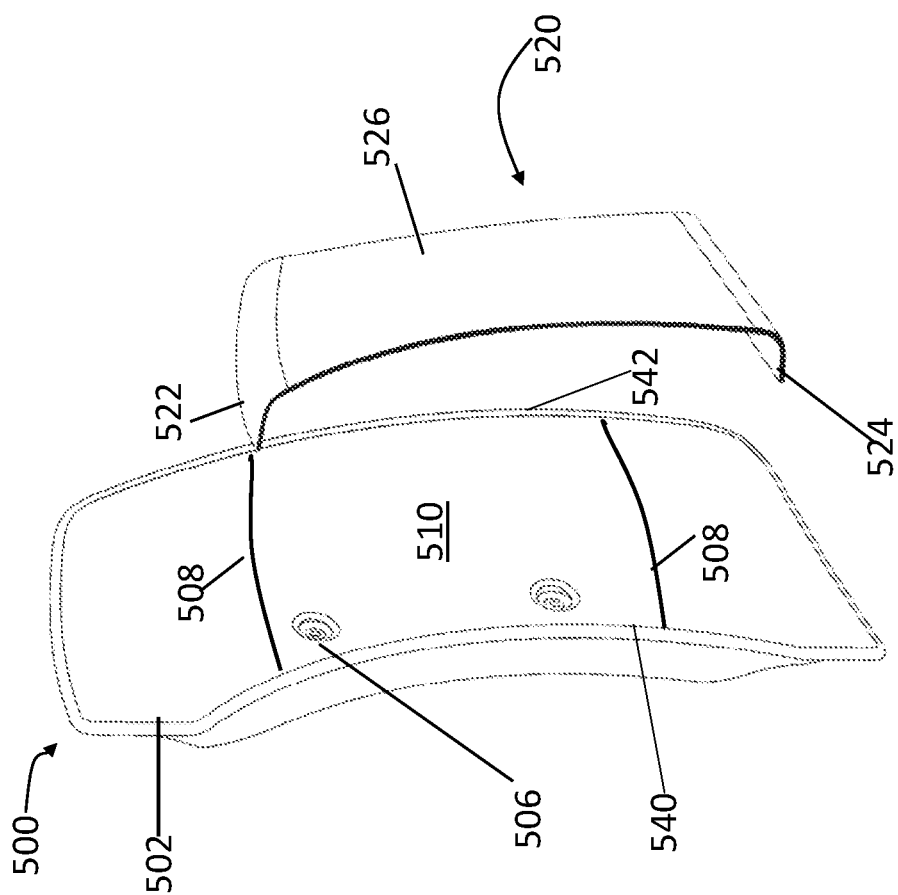
FIG. 5A is an exploded view of another embodiment of a fairing assembly.
Figure 5C:
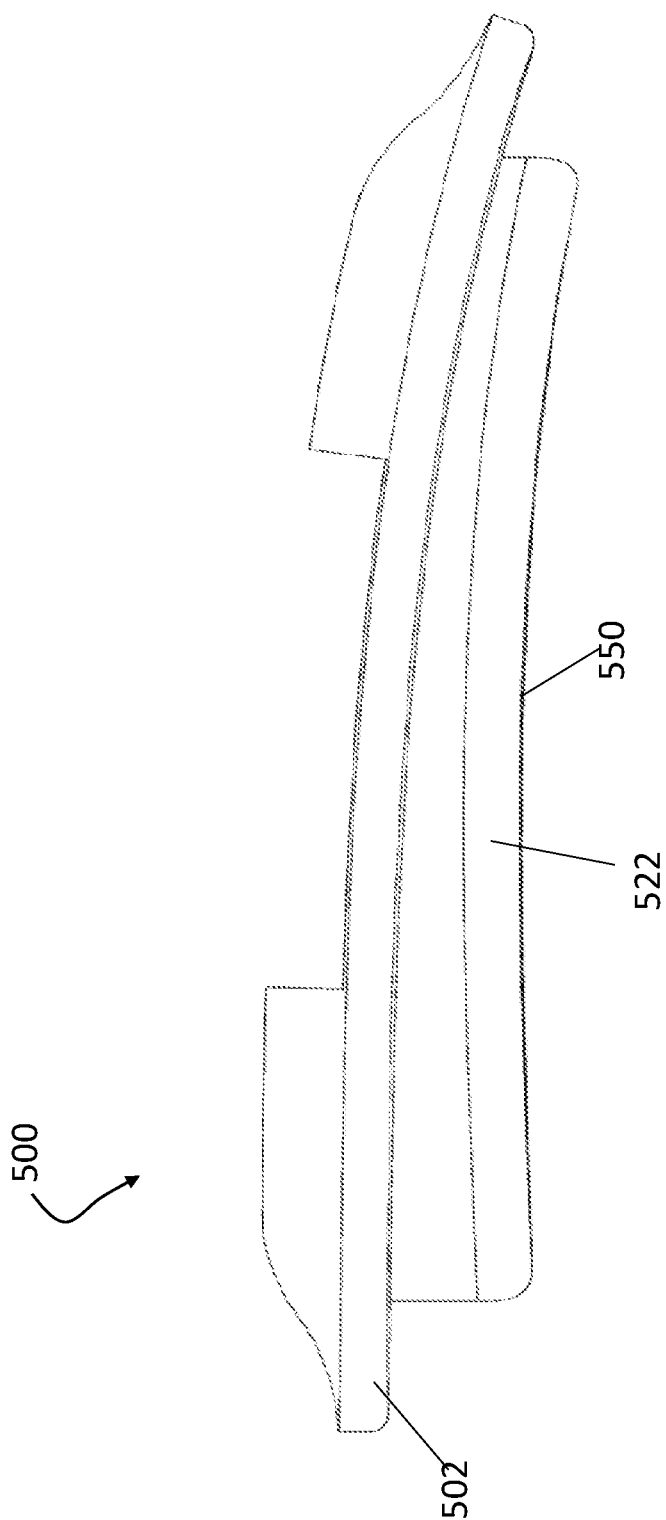
FIG. 5C is a top view of the embodiment of FIG. 5A.

FIG. 5A is an exploded view of an embodiment of a rear fairing assembly 500 comprising a fairing 502 and a fairing cap 520, FIG. 5B is an assembled view of fairing assembly 500 and FIG. 5C is a top view of fairing assembly 500. Rear fairing assembly 500 may be an example of rear fairing assembly 416.

In general, fairing 500 and fairing assembly 502 have a generally thin lateral profile and a much larger longitudinal profile, providing a surface area to promote streaming. The outboard surface of fairing assembly 500 may form an aerodynamic outer surface that provides attached flow for longitudinal air flow (air flow streaming back as the vehicle moves forward) and can direct flow in a longitudinal angle such as parallel to the longitudinal axis of the vehicle, primarily back and inwards or back and outwards. Preferably, the fairing assembly has a sufficient projected surface area (in view from the side of the vehicle) to promote attached flow.

Rear fairing 502 comprises a mounting area for rear fairing 502 and can include features, such as ribs or other features, to increase the rigidity of rear fairing 502 around the mounting area. Rear fairing assembly 500 mounts to a support structure that, in turn, mounts to the vehicle frame. The support structure may include a support arm (e.g., support arm 418), adapter plate or other structures. Examples of support arms include, but are not limited to support arms for mud flap fairings as described in U.S. Pat. Nos. 9,027,983 and 9,663,157, both of which are fully incorporated herein by reference for all purposes. Furthermore, according to one embodiment, rear fairing 502 can be a mud flap fairing. In the illustrated embodiment, mounting portion 510 includes a hardware opening running from the outboard surface of mounting portion 510 and inboard through fairing 502 to accommodate the mounting hardware used to mount the fairing assembly to a support structure. For example, rear fairing 502 includes an array of fastener openings 506 through which fasteners, such as bolts, screws or other fasteners, may be inserted so that rear fairing 502 can be attached to the support structure. The openings may be spaced so that rear fairing 502 can be attached to a fairing adapter plate as described, for example, in U.S. Pat. Nos. 9,027,983 and 9,663,157. In addition or in the alternative, the mounting fasteners and associated fastener openings may also be located on a sidewall of the fairing, the inner surface of the fairing, or another location on the fairing.

Rear fairing cap 520 can be coupled to rear fairing 502 to cover, from the outboard side, the fasteners that hold rear fairing 502 to the support arm. In the embodiment illustrated, rear fairing cap comprises an upper wall 522, a lower wall 524 and an outboard sidewall 526 extending from upper wall 522, and lower wall 524 and rear fairing 502 includes geometric features 508 that capture the inboard ends of walls 522, 524, such as edges behind which the ends of walls 522, 524 snap. Several non-limiting examples of geometric features are discussed in greater detail below with respect to FIGS. 7A, 7B, 8A and 8B.

When assembled, inner surface of sidewall 526 is spaced from the facing outboard surface 510 of rear fairing 502 to create an air duct 530 between rear fairing 502 and cap 520. The duct 530 may have a desired shape. For example, in FIG. 5A and FIG. 5B duct 530 narrows from front to back. In other embodiments, however, duct 530 may have other shapes. The inner surface of cap 520 or outboard surface 510 may include ribs or other features to form multiple channels from front to rear in the duct 530.

Fairing assembly 500 has a leading edge 540 and a trailing edge 542. Leading edge 540 has a curved portion for accommodating the profile of a wheel. Fairing 502 may be shaped to have a continuous aerodynamic outboard surface 510 from leading edge 540 to trailing edge 542 to promote attached flow across the surface. The outboard surface 510 and inboard surface of sidewall 526 can be shaped to create a duct 530 that interfaces with the airflow and controls the airflow in a desirable manner. Moreover, the outboard surface 550 of cap 520 can also be shaped to provide an aerodynamic surface. 5C shows a top view of rear fairing illustrating how the duct 530 may be configured at a different angle or curvature from the fairing, and how the duct may provide for an inlet area that is different from the outlet area.

Figure 6B:
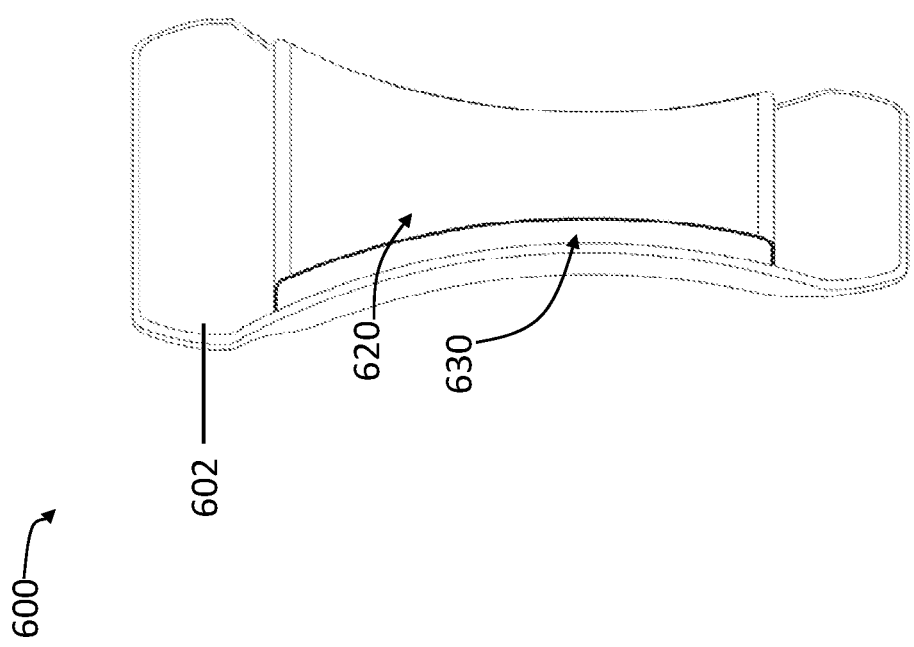
FIG. 6B is perspective view of the embodiment of FIG. 6A.
Figure 6A:
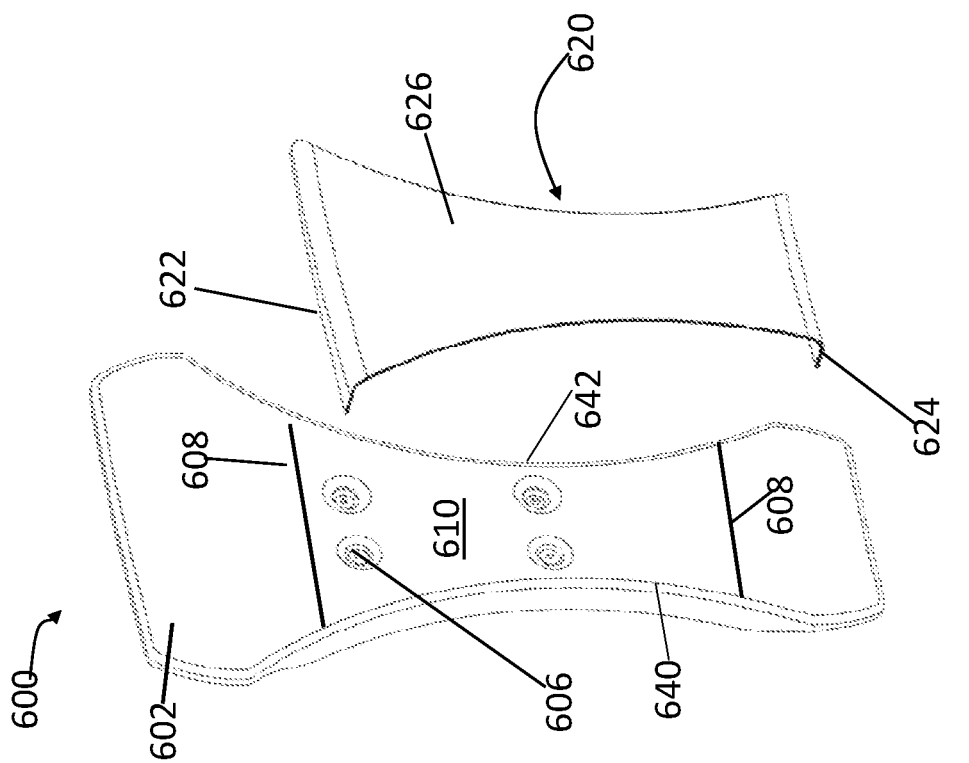
FIG. 6A is an exploded view of another embodiment of a fairing assembly.

FIG. 6A is an exploded view of an embodiment of a middle fairing assembly 600 comprising a middle fairing 602 and a fairing cap 620 and FIG. 6B is an assembled view of fairing assembly 600. Middle fairing assembly 600 can be an example of middle fairing assembly 412. Middle fairing assembly 600 may ensure air flow stays outboard of the tires on the rear tandem axle (i.e., may reduce or prevent air flow from entering the space between the front axle tires and the rear axle tires). The middle fairing assembly 600 may also contain other aerodynamic features such as vents, ribs, and other features, for reducing drag and controlling splash and spray, or providing ventilation for dissipating heat.

Middle fairing assembly 600 mounts to a support structure, in turn, mounts to the vehicle frame and spans between tires on a front tandem axle and tires on a rear tandem axle. The support structure may include a support arm, adapter plate or other structures. Examples of support arms include, but are not limited to middle fairing support arms described in U.S. Pat. Nos. 9,027,983 and 9,663,157, both of which are fully incorporated herein by reference for all purposes. Fairing 602 includes a hardware opening running from the outboard surface of fairing 602 and inboard through fairing 602 to accommodate the mounting hardware used to mount the fairing assembly to a support structure. For example, fairing 602 includes an array of fastener openings 606 through which fasteners, such as bolts, screws or other fasteners, may be inserted so that middle fairing 602 can be attached to the support structure. The openings may be spaced so that the middle fairing can be attached to a fairing adapter plate as described in U.S. Pat. Nos. 9,027,983 and 9,663,157. In addition or in the alternative, the mounting fasteners and associated fastener openings may also be located on a sidewall of the fairing, the inner surface of the fairing, or another location on the fairing.

Middle fairing cap 620 can be coupled to middle fairing 602 to cover, from the outboard side, the fasteners that hold middle fairing 602 to the support arm. In the embodiment illustrated, middle fairing cap comprises an upper wall 622, a lower wall 624, and an outboard sidewall 626 extending from upper wall 622 and lower wall 624 and fairing 602 includes geometric features 608 sized to receive and capture the inboard ends of upper wall 622 and lower wall 624.

Several non-limiting examples of geometric features are discussed in greater detail below with respect to FIGS. 7A, 7B, 8A and 8B.

When assembled, the inner surface of sidewall 626 is spaced from the facing outboard surface 610 of middle fairing 602 to create an air duct 630 between rear fairing 602 and cap 620. The duct 630 may have a desired shape. The inner surface of cap 620 or outboard surface 610 may include ribs or other features to form multiple channels in the duct 630 from front to rear.

Fairing assembly 600 includes a leading edge 640 and a trailing edge 642. According to one embodiment, leading edge 640 may be curved to substantially conform to the shape of a tire forward of assembly 600 and trailing edge 642 may have a curved shape to conform to the shape of tire to the rear of assembly 600. Fairing 602 forms an aerodynamic outboard surface 610 between leading edge 640 and trailing edge 642 that promotes attached rearward flow (when the vehicle is moving forward). In some cases, the outer surface 610 may direct the flow rearward or rearward and slightly inward or outward. The outer surface may have a variety of profiles including flat, curved outward toward the rear, or other profile. Moreover, the outboard surface 610 of fairing 602 and inner surface of sidewall 626 can be shaped to create a duct 630 that interfaces with the airflow and controls the airflow in a desirable manner.

Figure 7B:
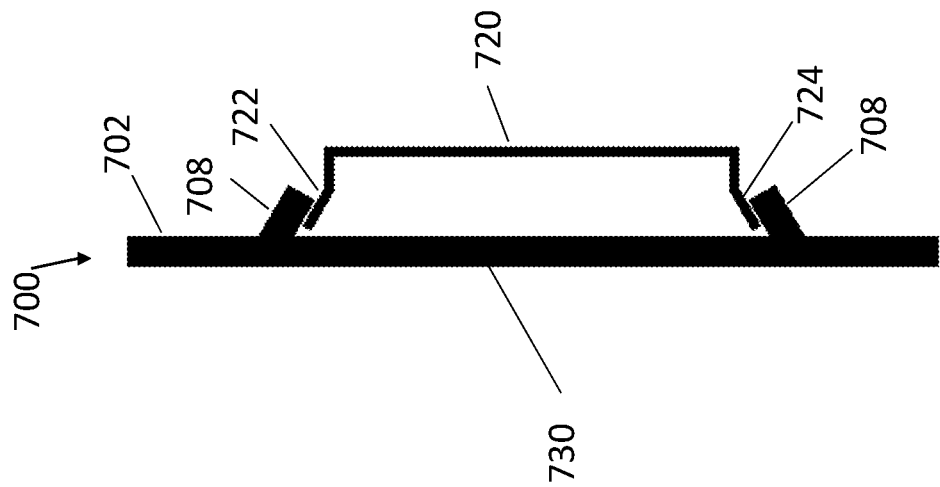
FIG. 7B is another view of the embodiment of FIG. 7A.
Figure 7A:
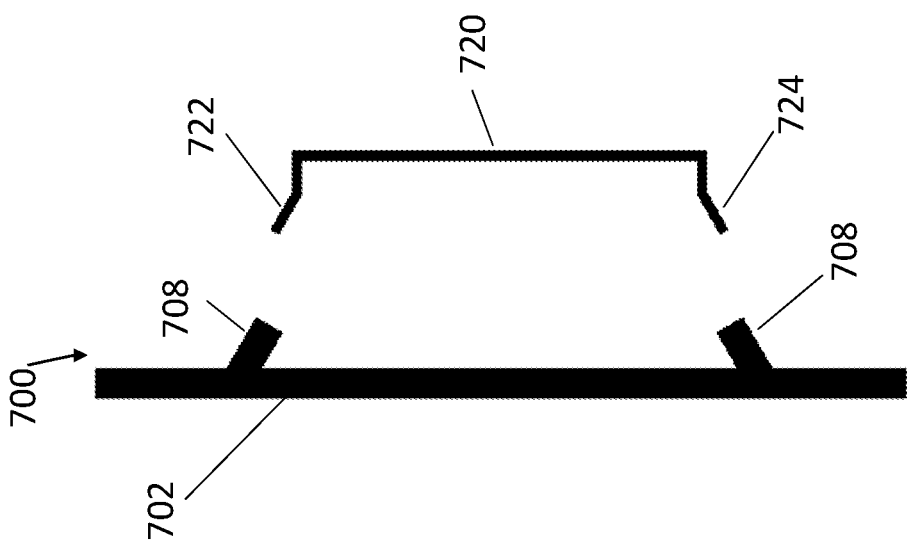
FIG. 7A is a view of another embodiment of a fairing assembly.

FIG. 7A and FIG. 7B illustrate a section view of one embodiment of a fairing assembly 700 having a fairing 702 and fairing cap 720. Fairing cap 720 may cooperate with fairing 702 to form a duct or gap between the fairing and the fairing cap may be sealed. Fairing 702 includes geometric features, in this case catches 708, to secure fairing cap 720. During assembly, the fairing cap upper wall 722 and fairing cap lower wall 724 can be flexed toward each other to pass catches 708. The inboard ends of a fairing cap upper wall 722 and fairing cap lower wall 724 can return outward to snap in place to the inboard side of catches 708. Features 708 represent one embodiment of features 508, 608 that can allow a ducted cap to be assembled with a fairing without tools.

Figure 8B:
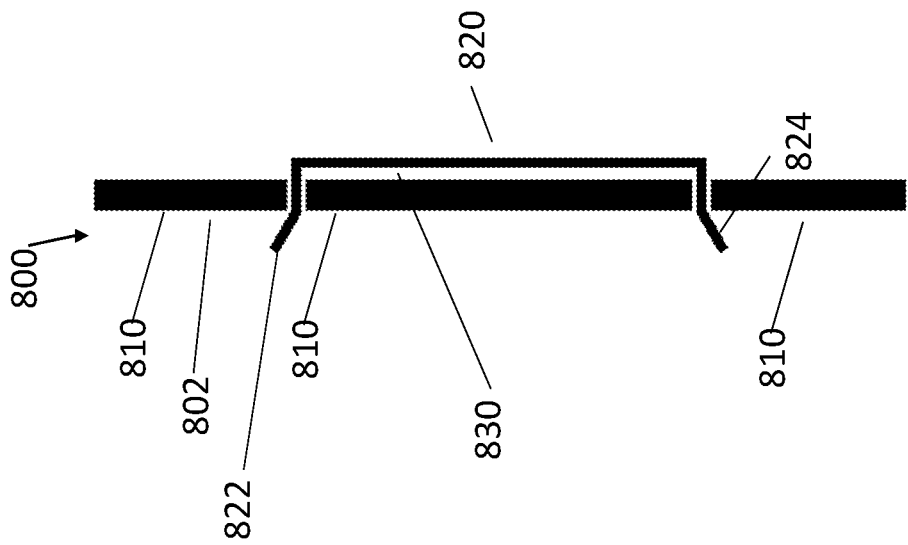
FIG. 8B is another view of the embodiment of FIG. 8A.
Figure 8A:
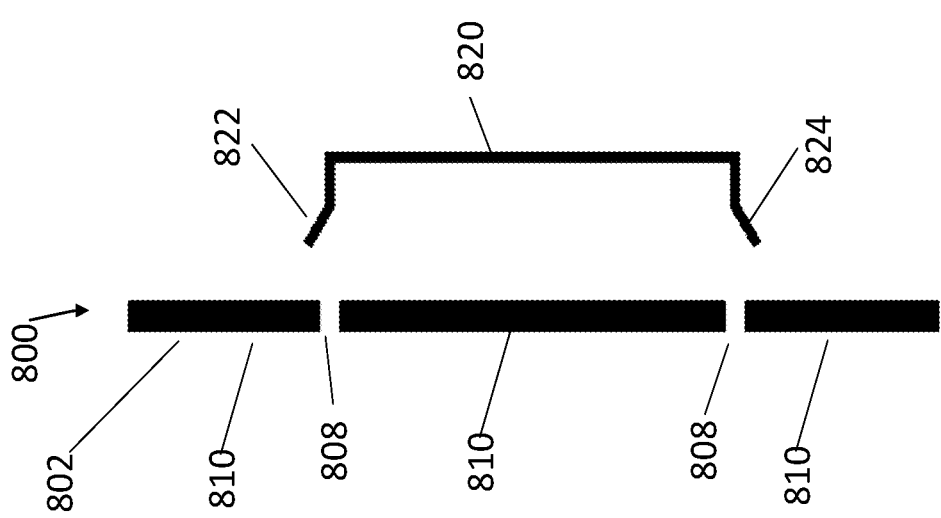
FIG. 8A is a view of another embodiment of a fairing assembly.

FIG. 8A and FIG. 8B illustrate section views of one embodiment of a fairing assembly 800 having a fairing 802 and fairing cap 820. Fairing cap 820 may cooperate with fairing 802 to form a duct or sealed gap 830. Faring 802 includes geometric features, in this case slots 808. During assembly, the fairing cap upper wall 822 and fairing cap lower wall 824 can be flexed toward each other to pass through openings 808. The inboard ends of a fairing cap upper wall 822 and fairing cap lower wall 824 can return outward snap in place inboard of fairing surface 810. Features 808 represent one embodiment of features 508, 608 that can allow a ducted cap to be assembled with a fairing without tools.

Figure 9:
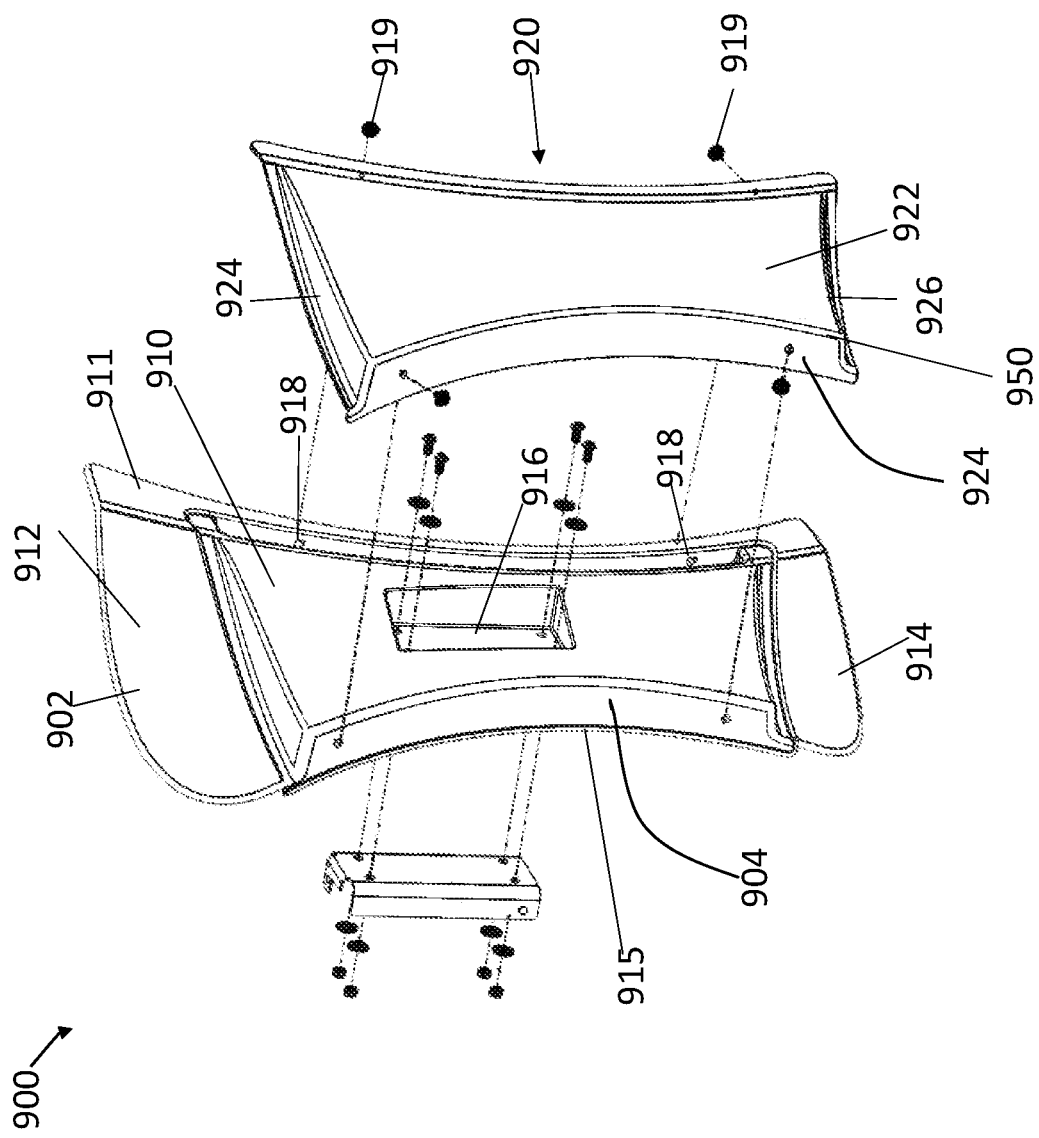
FIG. 9 is an exploded view of another embodiment of a fairing assembly.

FIG. 9 is an exploded view of an embodiment of a middle fairing assembly 900 comprising a middle fairing 902 and a fairing cap 920. Middle fairing assembly 900 may ensure air flow stays outboard of the tires on the rear tandem axle (i.e., may reduce or prevent air flow from entering the space between the front axle tires and the rear axle tires). The middle fairing assembly 900 may also contain other aerodynamic features such as vents, ribs, or other features, for reducing drag and controlling splash and spray, or providing ventilation for dissipating heat.

In FIG. 9, middle fairing 900 comprises a center portion 910, an upper portion 912, a lower portion 914, a front portion 911 and a rear portion 915. The outboard surface of one or more of the upper and lower portions 912, 914 may be in the same plane as, inset from or be more outboard from the outboard surface of center portion 910. From front-to-rear, the outboard surface of center portion 910 slopes outward to provide a wedge shape. The center of center portion is inset to provide a mounting area 916 having an array of fastener openings for fasteners used to mount fairing 902 to a support structure. The mounting area 916 could also be configured as an opening in the fairing which may in turn be covered by the fairing cap in order to, for example, reduce total material usage.

In the example of FIG. 9, the support structure includes a mounting plate 918, which can be mounted, in turn, to a support arm or other structure. The outboard ends of the fastener openings are thus located in a recess (e.g., a pocket or other recess) formed by the shape of the outboard surface of middle fairing 902. The mounting area for middle fairing 902 and can include features, such as ribs or other features, to increase the rigidity of middle fairing 902 around the mounting area.

Fairing cap 920 can be coupled to middle fairing 902 to cover the fasteners that hold middle fairing 902 to the mounting plate. In the embodiment illustrated, fairing cap comprises a sidewall 922, and rear wall 924, upper wall 926 and lower wall 928 that form a pocket. The inner surface of fairing cap 920 is shaped to conform the outboard surface of fairing 902 at middle section 910 so that middle section 910 can nest in fairing cap 920.

Fairing cap 920 may be attached to middle fairing in a variety of manners. In one embodiment, the rear wall 924 of fairing cap includes fastener openings that align with fastener openings in the rear wall 904 of middle section 910. In addition, fastener openings in cap 920 can align with faster openings 918 through the outboard surface of fairing 902. Fasteners can thus be used to fasten cap 920 to fairing 910.

According to one embodiment, fairing cap 902 may incorporate a live hinge (e.g., along transition 950 between the sidewall 922 and rear wall 924) so that, by removing fasteners 919, an operator can open the cap to reveal mounting area 916.

Fairing assembly 900, when assembled, comprises a center portion formed by center portion 910 and cap 920, an upper portion 912 and a lower portion 914. Through the selection of shape or materials, the upper portion 912, front portion 911, rear portion 915 and lower portion 914 may be more flexible than the center portion to absorb impacts from the ground, trailer, tires, or other objects. According to one embodiment, for example, fairing 902 can be formed such that upper portion 912 and lower portion 914 are more flexible than center portion 910. In addition or in the alternative, fairing cap 920 may formed for a more rigid material than fairing 902 and thus provide increased stiffness at the center portion of the assembled fairing or more overall stiffness to the fairing assembly.

In the embodiment illustrated in FIG. 9, fairing assembly 900 forms an aerodynamic outboard surface between a leading edge and a trailing edge that promotes attached rearward flow (when the vehicle is moving forward). In this example, the outer surface directs the flow rearward and outward. According to one embodiment, the leading edge may be curved to substantially conform to the shape of a tire forward of assembly 900 and the trailing edge may have a curved shape to conform to the shape of tire to the rear of assembly 900.

Figure 10:
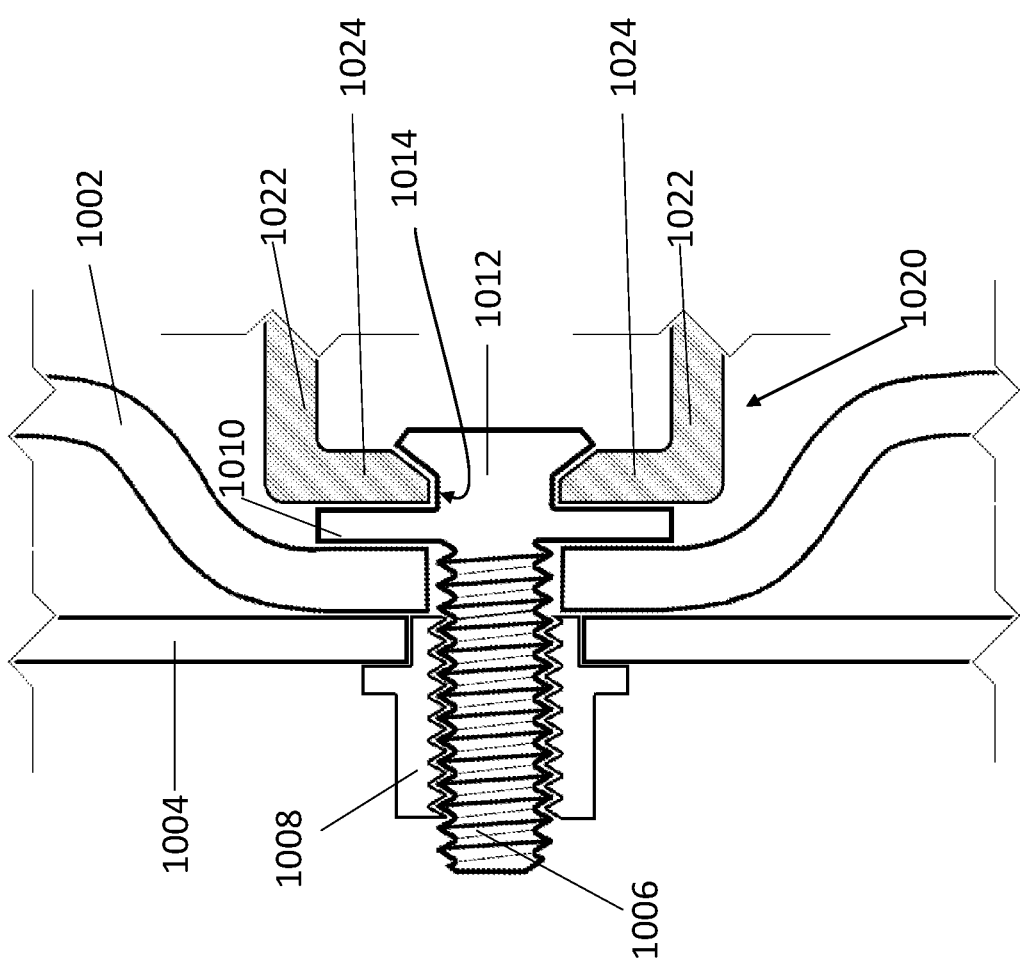
FIG. 10 is a sectional view of one embodiment of a connection system for connecting a fairing cap to mounting hardware.

FIG. 10 illustrates one embodiment of a fairing 1002 mounted to a support structure 1004. In the embodiment illustrated, fairing 1002 is mounted using a bolt 1006 and nut 1008. Bolt 1006 includes a radial flange spaced from the fastener's head 1012 to create an annular depression 1014 between head 1012 and flange 1010. A fairing cap includes a clip 1020 that projects inboard from the inner surface of the fairing cap. The clip includes fingers 1022 that have a radially inward protruding parts 1024 (e.g., hook, stud, detent, bead). The fingers 1022 are adapted to deflect briefly during the attachment operation and then return inward so that the protruding parts 1024 catch in depression 1014. While only one fastener is illustrated, it will be appreciated that multiple fasteners may be used to mount a fairing 1002.

As will be appreciated from the foregoing discussion, a cap may be used in combination with an aerodynamic quarter fender, wheel cover, center tandem fairing, or rear tandem fairing to: 1) conceal mounting hardware; 2) allow the use of more desirable material properties for the fairing such as those which may be more flexible, durable, or have other desired characteristics while using the cap to provide additional structural support; 3) provide improved aerodynamics by covering openings in the fairing or creating a duct which allows the cap as well as the fairing outboard surface to interface with the airflow and control the airflow in a desired manner; 4) provide a surface which can be painted; or 5) permit combinations of designs to be used (i.e. multiple different caps can be used with the same fairing). Other advantages may be obtained as well.

It can be noted that an aerodynamic system may employ different types of caps. For example, the middle assembly may use a ducted cap (e.g., cap 620) while the rear fairing assembly does not. In another embodiment, the rear fairing assembly may use a ducted cap (e.g., cap 520) while the middle fairing does not.

The shape, size, materials, stiffness, and other characteristics of a fairing (e.g., fairing 202, 302, 502, 602, 702, 802, 902) and fairing cap (e.g., fairing cap 220, 320, 520, 620, 720, 820, 920) may be selected to provide desired aerodynamics; minimize splash/spray; provide clearance with wheels to prevent rubbing/damage; provide clearance from top (trailer) contact to prevent damage; clearance from bottom/road (ground) contact to prevent damage; universal fit to fit different trucks that have different wheel sizes/spacing, frame heights; rigidity or structure, especially to provide increased rigidity in areas of the rear fairing assembly that are used for mounting or that are unlikely to come into contact with the wheels, trailer, or ground, for example and increased flexibility and resiliency in areas that are likely to come into contact with the wheels, trailer, or ground, for example. A fairing assembly may be curved and sized for use by itself or in combination with other fairing assemblies, quarter fenders, or wheel covers.

Fairings and fairing caps are preferably manufactured of one or more durable materials, such as polyurethane, which can absorb frequent impacts and deflections of the material. Preferred materials for manufacturing a fairing include plastics, metals, and composites. A deflectable, resilient, and wearable material such as TPO, TPV, TPE, Santoprene, or polyurethane may be desired, especially for regions of the part that may contact a trailer, ground, or wheels. Some materials or manufacturing processes that may provide a part with a lower density, such as low density polyurethane, blow-molding, or rotational molding, for example, may be desired such that the part is less likely to cause additional damage if it is damaged or dislodged from the vehicle, for example. According to one embodiment, the fairing (e.g., fairing 202, 302, 502, 602, 702, 802, 902) is formed of a more flexible plastic and fairing cap (e.g., fairing cap 220, 320, 520, 620, 720, 820, 920) is formed of a more rigid plastic or metal, such as aluminum.

A fairing cap may be attached to a fairing using a variety of methods. A fairing cap may be attached permanently or removably, with or without the use of tools, and with or without the need to modify the geometry of any of the parts being joined. A fairing cap may be attached to panel by adhesive, removable clips, molded-in clips. Attaching a fairing cap to a fairing may include clipping the fairing cap into the fairing in a way that requires flexing one of the parts.

Support structures for fairing assemblies may include support arms, adapter plates and other structures. Support arms may use a spring or other attachment to allow deflection of a fairing assembly. Deflection of the fairing assembly may allow a person to access components behind the assembly, and may also absorb energy from tire blowouts, impacts or other debris. According to one embodiment, the arm may use a two-sided spring attachment to also allow deflection of a fairing in relation to the arm. In another embodiment, the arm may be fixed at the vehicle end, but the fairing adapter may be spring mounted to allow the fairing to deflect relative the arm. Multiple hangers having spring attachments having one-sided (vehicle side or fairing side) or two-sided spring attachments may be used to mount multiple fairings or to support a single larger fairing. In some cases, some fairings may be coupled to arms having spring attachments while others are coupled to arms that are fixed or a single fairing may be coupled to one or more arms having spring attachments and to one or more fixed arms. Multiple fairings may also be coupled to the same arm (e.g., inboard and outboard of a mud flap or elsewhere). In other embodiments a substantially larger fairing may be used or one or more of the fairings shown may be combined into a single fairing.

According to one embodiment, a fairing support arm may have an adjustable length. Embodiments of an adjustable length hanger may allow the hanger length to be set in any desired range, depending on vehicle. Adjustable and fixed length arms may use a spring attached and have a variety of form factors. In some embodiments the arms may be straight. In others, the arms may be angled at the end (e.g., "shorty" hangers). A support arm may mount to a vehicle frame in a manner that allows the position of the arm to be selectable.

According to one embodiment, an assembly base may include a connection system that accommodates various hole patterns in a frame rail or other portion of a vehicle so that the base may be used with different hole configurations. In another embodiment, the base may include an adapter that allows the base to be mounted in one or more positions or rotational orientations.

In one embodiment, the arm may be a mud flap hanger arm. A rear fairing (e.g., fairing 202, 502) may mount to the mud flap hanger and be positioned outboard of the mud flap. In other embodiments, a fairing may be integral with a mud flap. Embodiments may also include a middle fairing hanger arm and middle fairing. The middle fairing hanger may have an adjustable length to accommodate various tire sizes and configurations, and may be deflectable as well.

A fairing (e.g., fairing 202, 302, 502, 602, 702, 802, 902) may be mounted to the end of the arm using an adapter that is coupled to or integral with the arm. According to one embodiment, the adapter may allow the horizontal, vertical or rotational position of the fairing to be selected. According to one embodiment, the adapter may include an adapter plate and a second plate. The second plate may be an end plate of an arm, a plate, a fixed or other plate coupled to a standard mud flap hanger or other hanger. The adapter plate may be coupled to the second plate in a number of selectable positions to adjust the mounting position of the fairing.

In some embodiments, a fairing assembly (e.g., fairing assembly 110, 112, 116, 200, 300, 410, 412, 416, 500, 600, 700, 800, 900) may be provided with mechanisms for controlling splash and spray while also reducing aerodynamic drag (for example, perforations, fluid atomizing features, fluid flow directing features such as ribs, fluid trapping or re-directing features, etc.). A fairing may be formed as a single body or it may be assembled, such as with a structural center portion for support with deflectable material attached to the outer edges of the center portion. A fairing cap be formed as a single body or it may be assembled.

According to one embodiment, the fairing or fairing assembly may have a variety of shapes. For example, the leading edge of the fairing assembly or fairing may be straight or curved and the outer surface of the fairing may flat, angled or curved outward, angled or curved inward or some combination thereof to promote desired aerodynamic flow. The fairing or fairing assembly may have symmetric design to fit either side of the vehicle in a desired position, including positions that are angled inward or outward.

A fairing cap may cover a larger or smaller area of a fairing that illustrated in the example embodiments. In some cases the fairing cap may cover the entire lower portion, upper portion, forward portion, rear portion, or middle portion of the fairing. A fairing cap can cover one or more sidewalls or edges of the fairing. Moreover, a fairing cap may extend to cover a portion of the inner surface of the fairing as well. In some embodiments, more than one fairing cap may be used per fairing.

Although the invention has been described with respect to specific embodiments thereof, these embodiments are merely illustrative, and not restrictive of the invention. The description herein of illustrated embodiments is not intended to be exhaustive or to limit the invention to the precise forms disclosed herein (and in particular, the inclusion of any particular embodiment, dimensions, feature or function is not intended to limit the scope to such embodiment, feature or function). Rather, the description is intended to describe illustrative embodiments, features and functions in order to provide a person of ordinary skill in the art context without limiting the invention to any particularly described embodiment, feature or function. While specific embodiments and examples are described herein for illustrative purposes only, various equivalent modifications are possible within the spirit and scope of this disclosure, as those skilled in the relevant art will recognize and appreciate. As indicated, these modifications may be made in light of the foregoing description of illustrated embodiments and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like. Furthermore, any dimensions, materials or other such characteristics are provided by way of example and not limitation.

Reference throughout this specification to "one embodiment," "an embodiment," or "a specific embodiment," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment," or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Furthermore, the characterization of any feature as "optional" herein is provided by example and is not intended to and should not be read to imply that other features not characterized as optional are not also optional in various embodiments.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

What is claimed is:

1. A fairing assembly adapted to couple to a vehicle, the fairing assembly comprising:
    a fairing, the fairing having a fairing outboard surface; and
    a fairing cap coupled to the fairing to at least partially cover at least a portion of the fairing outboard surface, the fairing assembly having an aerodynamic outer surface adapted to direct flow, wherein the fairing cap and faking cooperate to form a duct.

2. The faking assembly of claim 1, wherein the fairing cap has an inboard surface shaped to conform to the fairing outboard surface.

3. The fairing assembly of claim 2, wherein the fairing cap is adhered to the fairing outboard surface.

4. The fairing assembly of claim 2, wherein the fairing cap is captured in a recess of the faking by a geometric feature.

5. The fairing assembly of claim 1, the faking cap comprising a fairing cap outboard surface that cooperates with the fairing outboard surface to provide the aerodynamic outer surface.

6. The fairing assembly of claim 1, wherein the fairing and fairing cap are formed of different materials.

7. The fairing assembly of claim 1, further comprising mounting hardware to mount the fairing to a support structure, wherein the fairing cap is coupled to the fairing by attachment to the mounting hardware.

8. The fairing assembly of claim 1, the fairing cap comprising:
    an upper fairing cap wall;
    a lower fairing cap wall; and
    a sidewall extending from the upper fairing cap wall to the lower fairing cap wall, the sidewall having an inboard surface that is spaced from and faces the fairing outboard surface to form the duct.

9. The fairing assembly of claim 8, the upper fairing cap wall and lower fairing cap wall each comprising an inboard end and the fairing comprising geometric features to capture the inboard ends of the upper fairing cap wall and the lower fairing cap wall.

10. The fairing assembly of claim 1, wherein the fairing comprises a rear fairing.

11. The fairing assembly of claim 1, wherein the fairing comprises a middle fairing.

12. A wheel fairing method comprising:
    mounting a fairing to a support arm, the fairing having a fairing outboard surface;
    coupling a fairing cap to the fairing to cover at least a portion of the fairing outboard surface and to form a fairing assembly, the fairing assembly having an aerodynamic outer surface adapted to direct flow, wherein coupling the fairing cap to the fairing comprises coupling the fairing cap to the fairing to form a duct; and
    positioning the fairing assembly proximate to a wheel of a vehicle.

13. The method of claim 12, wherein coupling the fairing cap to the fairing further comprises placing the fairing cap in a recess defined by the fairing outboard surface, wherein the fairing cap has an inner surface shaped to conform to the fairing outboard surface.

14. The method of claim 13, wherein coupling the fairing cap to the fairing comprises adhering the fairing cap to the fairing outboard surface.

15. The method of claim 12, wherein coupling the fairing cap to the fairing comprises catching a portion of the fairing cap with a geometric feature of the fairing.

16. The method of claim 12, wherein the fairing cap is more rigid than the fairing.

17. A fairing assembly adapted to couple to a vehicle, the fairing assembly comprising:
    a fairing, the fairing having a fairing outboard surface; and
    a fairing cap coupled to the fairing to at least partially cover at least a portion of the fairing outboard surface, the fairing assembly having an aerodynamic outer surface adapted to direct flow, wherein the fairing cap comprises a hinge, and wherein a portion of the fairing cap is rotatable about the hinge to reveal the at least a portion of the fairing outboard surface.

18. The fairing assembly of claim 17, wherein the fairing cap further comprises first, second, and third walls that form a pocket and the fairing comprises a section adapted to nest in the pocket of the fairing cap.

19. The fairing assembly of claim 1, wherein the duct has a front and a rear, and wherein the duct has a shape that narrows from the front to the rear of the duct.

20. The fairing assembly of claim 8, wherein the duct has a front and a rear, and wherein the fairing assembly comprises one or more ribs to form multiple channels from the front to the rear of the duct.

* * * * *

UNITED STATES PATENT AND TRADEMARK OFFICE
CERTIFICATE OF CORRECTION

PATENT NO. : 10,654,529 B2
APPLICATION NO. : 16/017591
DATED : May 19, 2020
INVENTOR(S) : Joshua Butler et al.

Page 1 of 1

It is certified that error appears in the above-identified patent and that said Letters Patent is hereby corrected as shown below:

In the Claims

Claim 1:
Column 17, Line 13, replace "faking" with "fairing"

Claim 2:
Column 17, Line 14, replace "faking" with "fairing"

Claim 4:
Column 17, Line 20, replace "faking" with "fairing"

Claim 5:
Column 17, Line 21, replace "faking" with "fairing"

Signed and Sealed this
First Day of September, 2020

Andrei Iancu
*Director of the United States Patent and Trademark Office*